US012748059B2

(12) United States Patent
Peng et al.

(10) Patent No.: US 12,748,059 B2
(45) Date of Patent: Sep. 29, 2026

(54) METHOD AND SYSTEM OF FULL-FIELD THREE DIMENSIONAL DISPLACEMENT MEASUREMENT VIA MICROWAVE SENSING

(71) Applicant: SHANGHAI JIAO TONG UNIVERSITY, Shanghai (CN)

(72) Inventors: Zhike Peng, Shanghai (CN); Yuyong Xiong, Shanghai (CN); Yingjie Gou, Shanghai (CN); Guang Meng, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 122 days.

(21) Appl. No.: 19/002,905

(22) Filed: Dec. 27, 2024

(65) Prior Publication Data

US 2026/0043755 A1 Feb. 12, 2026

Related U.S. Application Data

(63) Continuation-in-part of application No. PCT/CN2024/112290, filed on Aug. 15, 2024.

(30) Foreign Application Priority Data

Aug. 12, 2024 (CN) ......................... 202411103757.3

(51) Int. Cl.
*G01N 22/00* (2006.01)
*G01B 15/06* (2006.01)

(52) U.S. Cl.
CPC ............. *G01N 22/00* (2013.01); *G01B 15/06* (2013.01)

(58) Field of Classification Search
CPC ................................ G01N 22/00; G01B 15/06
See application file for complete search history.

(56) References Cited

U.S. PATENT DOCUMENTS 12,130,355 B2 * 10/2024 Ghiri ...................... G01N 22/00
12,625,088 B2 * 5/2026 Hirzallah .............. G01N 22/00
(Continued)

FOREIGN PATENT DOCUMENTS

CN 102323578 A 1/2012
CN 105783798 A 7/2016
(Continued)

OTHER PUBLICATIONS

Notice of Grant received for Chinese Application No. 202411103757.3, dated Aug. 19, 2025.
(Continued)

*Primary Examiner* — Reena Aurora
(74) *Attorney, Agent, or Firm* — Greer, Burns & Crain, Ltd

(57) ABSTRACT

A method and system of full-field 3D displacement measurement via microwave sensing relates to the field of displacement measurement, such as deformation and vibration measurement. A structure coordinate system (SCS) is established based on a target under measurement, and a device coordinate system (DCS) is established based on microwave transceivers. Measuring points are mapped from the SCS into range-angle heatmaps of the microwave transceivers and thereby matched. Displacement time series of the measuring points on the target under measurement are monitored, obtaining initial 3D displacement time series of the target under measurement in the DCS. Based on a transformation relationship from the DCS to the SCS, transformed 3D displacement time series of the target under measurement in the SCS are calculated. The present application enables automatic full-field selection and matching of measuring points in microwave sensing based 3D displacement measurement in complex applications.

17 Claims, 7 Drawing Sheets

(56) References Cited

U.S. PATENT DOCUMENTS

| | | | | |
|---|---|---|---|---|
| 2021/0003692 | A1* | 1/2021 | Nohmi | G01S 13/58 |
| 2022/0187158 | A1 | 6/2022 | Peng et al. | |

FOREIGN PATENT DOCUMENTS

| | | | |
|---|---|---|---|
| CN | 110705433 | A | 1/2020 |
| CN | 112924961 | A | 6/2021 |
| CN | 113624374 | A | 11/2021 |
| CN | 114018167 | A | 2/2022 |
| CN | 114114267 | A | 3/2022 |
| CN | 114396864 | A | 4/2022 |
| CN | 115931269 | A | 4/2023 |
| CN | 117590342 | A | 2/2024 |
| CN | 117872396 | A | 4/2024 |
| JP | 2011080789 | A | 4/2011 |
| WO | 2021109473 | A1 | 6/2021 |

OTHER PUBLICATIONS

Office Action received for Chinese Application No. 202411103757.3, dated Jul. 4, 2025.

Xiong, Y., et al., "Full-field 3D displacement measurement via microwave sensing," Mechanical Systems and Signal Processing, vol. 234, Jul. 1, 2025, 112804, 5 pages (Full Summary).

International Search Report for PCT/CN2024/112290, dated May 7, 2025.

Wang, P., "Laser Measurement Technology," Beijing: China Machine Press, 2020, pp. 160-161.

Liang, R., "Industrial Robot Product Quality and Safety Testing (Advanced)," Harbin Institute of Technology Press, 2021, pp. 50-51.

* cited by examiner (a)

(b)

METHOD AND SYSTEM OF FULL-FIELD THREE DIMENSIONAL DISPLACEMENT MEASUREMENT VIA MICROWAVE SENSING

RELATED APPLICATIONS

This application is a continuation-in-part (CIP) application claiming benefit under 35 U.S.C. 120 of PCT/CN2024/112290 filed on Aug. 15, 2024, which claims priority to Chinese Patent Application No. 202411103757.3 filed on Aug. 12, 2024, the disclosures of which are incorporated herein in their entirety by reference.

BACKGROUND

The present application relates to the field of displacement measurement, including deformation and vibration measurement, and particularly to a method and system of full-field three-dimensional (3D) displacement measurement via microwave sensing.

DESCRIPTION OF THE PRIOR ART

Vibration and deformation are ubiquitous phenomena in nature. Vibration and deformation measuring and monitoring are necessary for health monitoring of large buildings and bridges, status characterization and trouble diagnosis of mechanical equipment, and even mechanical property analysis of biological tissues. Displacement is an important physical quantity used to characterize the amplitude of vibration, deformation and other forms of motion because it contains various crucial information in both the time and frequency domains.

Despite a range of advantages including a large measurement range, high sensitivity and high environmental adaptation, displacement measurement technology based on microwave sensing is incapable of precise full-field three-dimensional (3D) displacement measurement of a target or measuring point required by practical engineering applications. Full-field 3D displacement measurement can reflect 3D spatial displacement information of all objects or points under measurement in a field of view (FoV) and is therefore highly demanded in complex scenes and equipment, vibration and deformation monitoring of structures and various motion sensing fields.

SUMMARY

From long-term observation and experimental findings, the inventor has found that the prior art is associated with the following problems:

(1) 3D displacement measurement of only a single target or a limited number of measuring points is possible. However, in complex measurement scenes with many measuring points or targets, where it would be necessary to arrange multiple microwave transceivers in the measurement space, for each measuring point, there tend to be significant coordinate differences between range-angle heatmaps of microwave transceivers, which are difficult to deal with. This creates challenges in matching a target or measuring point across the range-angle heatmaps of the microwave transceivers, making extraction of distance and associated displacement information of a target or point under measurement in the line-of-sight (LoS) directions of the various microwave transceivers from the resulting baseband signals, which is necessary for 3D displacement measurement of the target or measuring point, difficult or even impossible.

(2) 3D displacement measurement is based on a device coordinate system (DCS) established with a number of measuring devices, such as microwave transceivers. Therefore, once the positions of these microwave transceivers are determined, the DCS is also determined. In order to measure a displacement of a target under measurement in a direction to be measured, it would be necessary to align the direction so that it is parallel to one of the coordinate axes of the DCS. However, since such displacement measurement carried out using microwave transceivers is contactless measurement that measures a target under measurement within a range typically of meters to tens of meters, for a direction to be measured, in which a user desires to measure a displacement component, it would be difficult in practice to ensure exact parallelism or perpendicularity of a DCS coordinate axis to this direction.

(3) 3D displacement measurement of a target under measurement must be carried out based on a DCS established with multiple microwave transceivers, which are distributed in a determined pattern at fixed intervals. Limited by the structure and size of the multiple microwave transceivers deployed at fixed positions, their spatial distribution is subject to strict position and size constraints. Consequently, significant increases in measurement errors tend to occur, in particular for a distant target or measuring point.

(4) Only 3D displacements of a target under measurement in a DCS established with a number of microwave transceivers can be obtained. That is, 3D displacement measurement results are obtained only in the coordinate system established with the microwave transceivers, but not in a reference coordinate system of any target or structure to be measured, in contrast to the fact that practical engineering applications pay particular attention to, and have a particular demand for, full-field 3D displacement information of a target or structure to be measured that references the target or structure itself.

In view of the above drawbacks of the prior art, the present application provides a method and system of full-field 3D displacement measurement via microwave sensing, in which three or more microwave transceivers are first arranged based on a target under measurement, and 3D coordinates of each microwave transceiver in a structure coordinate system (SCS) established with selected reference targets or measuring points are then calculated. Subsequently, a device coordinate system (DCS) is established based on spatial positions of the multiple microwave transceivers. Next, the measuring points are mapped from the SCS to range-angle heatmaps of the microwave transceivers, obtaining coordinates of the measuring points in the range-angle heatmaps of all the microwave transceivers (also called range-angle unit positions). Additionally, measuring points matched across the microwave transceivers are selected based on their coordinates in the range-angle heatmaps, and all the microwave transceivers are controlled to simultaneously measure displacement time series of the measuring points. The microwave transceivers simultaneously transmit frequency-modulation continuous-wave (FMCW) microwave signals to the measuring points and receive corresponding echo signals. From baseband signals, distances of the measuring points in LoS directions of the microwave transceivers are extracted, as well as corresponding displacement information. 3D displacement time series of the measuring points in the DCS are calculated. Finally, if required, a transformation relationship from the DCS to the SCS is derived and used to calculate 3D displacement time series of the measuring points in the SCS.

The present application provides a method of full-field 3D displacement measurement via microwave sensing, comprising: establishing an SCS based on a target under measurement; establishing a DCS based on a first microwave transceiver, a second microwave transceiver and a third microwave transceiver; monitoring displacement time series of the target under measurement by the first microwave transceiver, the second microwave transceiver and the third microwave transceiver, thereby obtaining initial 3D displacement time series of the target under measurement in the DCS; establishing a coordinate transformation relationship from the DCS to the SCS based on the DCS and the SCS; and calculating transformed 3D displacement time series of the target under measurement in the SCS based on the coordinate transformation relationship and the initial 3D displacement time series.

In some embodiments, optionally, a detection FoV of the first microwave transceiver may cover the target under measurement, a detection FoV of the second microwave transceiver may cover the target under measurement, and a detection FoV of the third microwave transceiver may cover the target under measurement.

In some embodiments, optionally, the positions of the first microwave transceiver, the second microwave transceiver and the third microwave transceiver may be non-collinear.

In some embodiments, optionally, a plane defined by two displacement directions to be measured for the target under measurement may be selected as a reference target plane, wherein a first reference target, a second reference target and a third reference target in the reference target plane are selected, which are non-collinear, and the SCS may be established based on the first reference target, the second reference target and the third reference target.

In some embodiments, optionally, the detection FoV of the first microwave transceiver may cover the first reference target, the detection FoV of the second microwave transceiver may cover the first reference target, and the detection FoV of the third microwave transceiver may cover the first reference target. Additionally, the detection FoV of the first microwave transceiver may cover the second reference target, the detection FoV of the second microwave transceiver may cover the second reference target, and the detection FoV of the third microwave transceiver may cover the second reference target. Further, the detection FoV of the first microwave transceiver may cover the third reference target, the detection FoV of the second microwave transceiver may cover the third reference target, and the detection FoV of the third microwave transceiver may cover the third reference target.

In some embodiments, optionally, the SCS may comprise an origin $O^S$, an $X^S$ axis, a $Y^S$ axis and a $Z^S$ axis, wherein: the origin $O^S$ is at the position of the first reference target; a positive direction of the $Y^S$ axis is a direction pointing from the first reference target toward the second reference target; a positive direction of the the $X^S$ axis is perpendicular to the positive direction of the $Y^S$ axis and points toward a half-plane where the third reference target is located; and a positive direction of the $Z^S$ axis points toward a half-space where the first microwave transceiver, the second microwave transceiver and the third microwave transceiver are located.

In some embodiments, optionally, coordinates of the first microwave transceiver, the second microwave transceiver and the third microwave transceiver in the SCS may be calculated based on distances between the first microwave transceiver and the first reference target, the second reference target and the third reference target, respectively.

In some embodiments, optionally, the DCS may be established based on coordinates of the first microwave transceiver, the second microwave transceiver and the third microwave transceiver in the SCS.

In some embodiments, optionally, the DCS may comprise an origin $O^D$ an $X^D$ axis, a $Y^D$ axis and a $Z^D$ axis, wherein: the origin $O^D$ is at the position of the first microwave transceiver; an $X^DO^DY^D$ plane of the DCS is defined by the positions of the first microwave transceiver, the second microwave transceiver and the third microwave transceiver; the $Z^D$ axis is perpendicular to the $X^DO^DY^D$ plane and points toward the target under measurement; a positive direction of the $Y^D$ axis is a direction pointing from the first microwave transceiver toward the second microwave transceiver; and a positive direction of the $X^D$ axis points toward a half-space where the third microwave transceiver is located.

In some embodiments, optionally, coordinates of the target under measurement in range-angle heatmaps of the first microwave transceiver, the second microwave transceiver and the third microwave transceiver may be calculated based on coordinates of the target under measurement, the first microwave transceiver, the second microwave transceiver and the third microwave transceiver in the SCS.

In some embodiments, optionally, measuring points on the target under measurement may be matched at the first microwave transceiver based on the coordinates of the target under measurement in the range-angle heatmap of the first microwave transceiver.

In some embodiments, optionally, the measuring points on the target under measurement may be matched at the second microwave transceiver based on the coordinates of the target under measurement in the range-angle heatmap of the second microwave transceiver.

In some embodiments, optionally, the measuring points on the target under measurement may be matched at the third microwave transceiver based on the coordinates of the target under measurement in the range-angle heatmap of the third microwave transceiver.

In some embodiments, optionally, the coordinate transformation relationship may be calculated based on coordinates of the first microwave transceiver, the second microwave transceiver and the third microwave transceiver in the DCS and on the coordinates thereof in the SCS.

In some embodiments, optionally, the coordinate transformation relationship may include rotation and translation matrices from the DCS to the SCS.

In some embodiments, optionally, the rotation and translation matrices may be calculated using standard orthogonal basis transformation.

In another aspect, the present application provides a system of full-field 3D displacement measurement via microwave sensing, comprising: a reference target module configured to be able to establish an SCS based on a target under measurement; a 3D displacement calculation module configured to be able to establish a DCS based on a first microwave transceiver, a second microwave transceiver and a third microwave transceiver; a microwave sensing and control module configured to be able to monitor displacement time series of the target under measurement using the first microwave transceiver, the second microwave transceiver and the third microwave transceiver; the 3D displacement calculation module further configured to be able to obtain initial 3D displacement time series of the target under measurement in the DCS; a coordinate transformation relationship calculation unit configured to be able to establish a coordinate transformation relationship from the DCS to the SCS based on the DCS and the SCS; and an SCS 3D displacement transformation unit configured to be able to calculate transformed 3D displacement time series of the target under measurement in the SCS based on the coordinate transformation relationship and the 3D displacement time series.

In some embodiments, optionally, the microwave sensing and control module may be further configured so that a detection FoV of the first microwave transceiver is able to cover the target under measurement, that a detection FoV of the second microwave transceiver is able to cover the target under measurement, and that a detection FoV of the third microwave transceiver is able to cover the target under measurement.

In some embodiments, optionally, the microwave sensing and control module may be further configured so that the positions of the first microwave transceiver, the second microwave transceiver and the third microwave transceiver are non-collinear.

In some embodiments, optionally, the reference target module may be further configured to be able to: select a plane defined by two displacement directions to be measured for the target under measurement as a reference target plane; select a first reference target, a second reference target and a third reference target in the reference target plane, which are non-collinear; and establish the SCS based on the first reference target, the second reference target and the third reference target.

In some embodiments, optionally, the microwave sensing and control module may be further configured so that the detection FoV of the first microwave transceiver is able to cover the first reference target, that the detection FoV of the second microwave transceiver is able to cover the first reference target, that the detection FoV of the third microwave transceiver is able to cover the first reference target, that the detection FoV of the first microwave transceiver is able to cover the second reference target, that the detection FoV of the second microwave transceiver is able to cover the second reference target, that the detection FoV of the third microwave transceiver is able to cover the second reference target, that the detection FoV of the first microwave transceiver is able to cover the third reference target, that the detection FoV of the second microwave transceiver is able to cover the third reference target, and that the detection FoV of the third microwave transceiver is able to cover the third reference target.

In some embodiments, optionally, the reference target module may be further configured so that the SCS comprises an origin $O^S$, an $X^S$ axis, a $Y^S$ axis and a $Z^S$ axis, wherein the origin $O^S$ is at the position of the first reference target; a positive direction of the $Y^S$ axis is a direction pointing from the first reference target toward the second reference target; a positive direction of the $X^S$ axis is perpendicular to the positive direction of the $Y^S$ axis and points toward a half-plane where the third reference target is located; and a positive direction of the $Z^S$ axis points toward a half-space where the first microwave transceiver, the second microwave transceiver and the third microwave transceiver are located.

In some embodiments, optionally, the system may further comprise a coordinate calculation unit configured to be able to calculate coordinates of the first microwave transceiver, the second microwave transceiver and the third microwave transceiver in the SCS based on distances between the first microwave transceiver and the first reference target, the second reference target and the third reference target, respectively.

In some embodiments, optionally, the 3D displacement calculation module may be further configured to be able to establish the DCS based on coordinates of the first microwave transceiver, the second microwave transceiver and the third microwave transceiver in the SCS.

In some embodiments, optionally, the 3D displacement calculation module may be further configured so that the DCS comprises an origin $O^D$, an $X^D$ axis, a $Y^D$ axis and a $Z^D$ axis, wherein: the origin $O^D$ is at the position of the first microwave transceiver; an $X^DO^DY^D$ plane of the DCS is defined by the positions of the first microwave transceiver, the second microwave transceiver and the third microwave transceiver; the $Z^D$ axis is perpendicular to the $X^DO^DY^D$ plane and points toward the target under measurement; a positive direction of the $Y^D$ axis is a direction pointing from the first microwave transceiver toward the second microwave transceiver; and a positive direction of the $X^D$ axis points toward a half-space where the third microwave transceiver is located.

In some embodiments, optionally, the system may further comprise a measuring point matching and selection module configured to be able to calculate coordinates of the target under measurement in range-angle heatmaps of the first microwave transceiver, the second microwave transceiver and the third microwave transceiver based on coordinates of the target under measurement, the first microwave transceiver, the second microwave transceiver and the third microwave transceiver in the SCS.

In some embodiments, optionally, the measuring point matching and selection module may be further configured to be able to: match measuring points on the target under measurement at the first microwave transceiver, the second microwave transceiver and the third microwave transceiver based on the coordinates of the target under measurement in the range-angle heatmaps of the first microwave transceiver, the second microwave transceiver and the third microwave transceiver.

In some embodiments, optionally, the coordinate transformation relationship calculation unit may be further configured to be able to calculate the coordinate transformation relationship based on coordinates of the first microwave transceiver, the second microwave transceiver and the third microwave transceiver in the DCS and on the coordinates thereof in the SCS.

In some embodiments, optionally, the coordinate transformation relationship calculation unit may be further configured so that the calculated coordinate transformation relationship comprises rotation and translation matrices from the DCS to the SCS.

In some embodiments, optionally, the coordinate transformation relationship calculation unit may be further configured to calculate the rotation and translation matrices using standard orthogonal basis transformation.

In yet another aspect, the present application provides a device of full-field 3D displacement measurement via microwave sensing, which comprises a memory, a processor and a computer program stored in the memory and executable on the processor. The processor is configured to be able to implement, when executing the computer program, the steps in the method of full-field 3D displacement measurement via microwave sensing as defined above.

In still yet another aspect, the present application provides a computer-readable storage medium storing thereon a computer program. The computer program is able to implement, when executed by a processor, the steps in the method of full-field 3D displacement measurement via microwave sensing as defined above.

The present application has at least the following advantages over the prior art:

(1) It allows a user-defined SCS to be established in the vicinity of a target under measurement. Since this coordinate system is established near or at the structure itself, some coordinate axes of the SCS can precisely extend in parallelism or perpendicularity to respective displacement directions of the user's interest.

(2) For reference targets arranged on a modeled structure, 3D measurement of distances between the reference targets can be accurately made using the 3D digital model of the structure. In case of placing calibration reference targets as reference targets, measurement accuracy can be improved by designing a model of the calibration reference targets with known distances.

(3) It enables positioning of microwave transceivers in the SCS and can accurately determine distances between the microwave transceiver in an automatic manner. Therefore, 3D displacement measurement via microwave sensing with increased calculation accuracy can be achieved, and a displacement component in any direction to be measured can be accurately determined.

(4) It allows determination of coordinates of measuring points in range-angle heatmaps of all microwave transceivers and automatic full-field matching and selection of measuring points at all the microwave transceivers in complex applications. Thus, full-field 3D displacement measurement via microwave sensing of multiple measuring points or all measuring points throughout a field of view can be achieved.

(5) 3D displacement information of measuring points or targets throughout an FoV can be obtained with only three or more reference targets or measuring points or three or more microwave transceivers, achieving less stringent layout requirements, low hardware complexity and high test efficiency. Measuring points can be directly selected in an SCS established with reference targets or measuring points and then automatically converted into range-angle heatmaps of different microwave transceivers, creating greater convenience in production or test sites. As 3D displacement time series can be obtained based on a user-defined SCS, flexible adjustments may be made according to the field test requirements to determine a displacement in any direction of the user's interest, circumventing the limitations associated with traditional 3D displacement measurement via microwave sensing, which arise from the reliance of a reconstructed displacement only on a DCS.

For a full understanding of the objects, features and effects of the present application, the concept, structural details and resulting technical effects will be further described with reference to the accompanying drawings.

DETAILED DESCRIPTION

Figure 1:
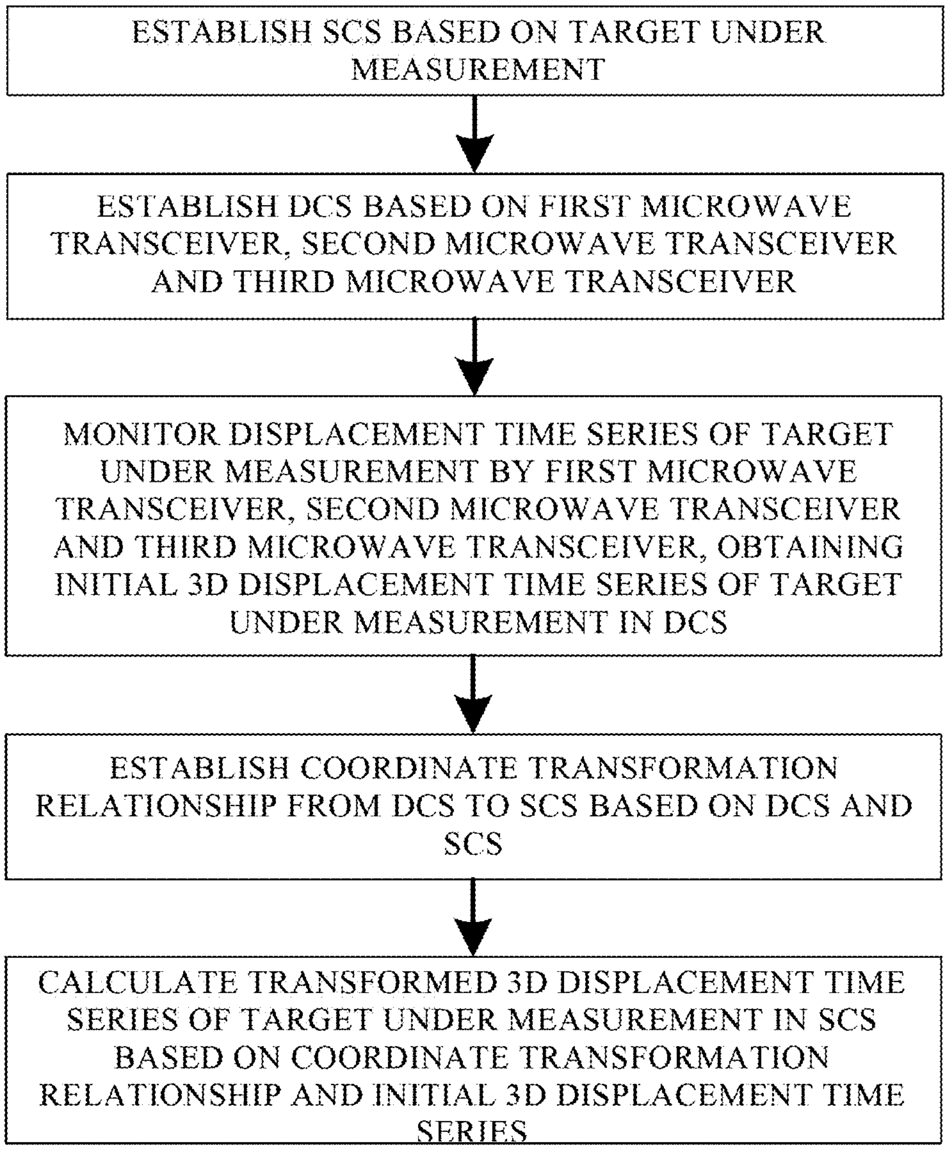
FIG. 1 shows a flowchart of a method of full-field 3D displacement measurement via microwave sensing according to an embodiment of the present application.

In the following, techniques of embodiments of the present application will be clearly and fully described. Apparently, the embodiments described herein are only some, but not all, possible embodiments of the application. This application may be embodied in various forms, and its scope is in no way limited to the embodiments herein. In light of the disclosed embodiments, those of ordinary skill in the art can obtain other embodiments without paying any creative effort. Accordingly, it is intended that any and all such embodiments fall within the scope of this application.

Techniques, methods and devices known to those of ordinary skill in the related art may not be discussed in detail, but where appropriate, these techniques, methods and devices are to be considered as part of this specification.

Various specific embodiments of the application will be described below with reference to the accompanying drawings, which form part of the specification. It will be understood that although directional terms such as "forward", "rearward", "above", "under", "left", "right", "inner", "outer", "top", "bottom", "front", "back", "proximal", "distal", "transverse", "longitudinal", "widthwise direction", "lengthwise direction", "heightwise direction", "axial", "radial", "clockwise", "counterclockwise" and the like may be used herein to describe various exemplary structural features and elements discussed herein, the use of these terms is merely illustrative and made with respect to the exemplary orientation of the annexed figures. The disclosed embodiments may also employ other directions than described or illustrated herein. Accordingly, these directional terms are only illustrative and not intended to be limiting.

The connections of the modules or components shown in the figures are exemplary and for ease of description, and those skilled in the art can adopt any other equivalent connections, as long as they still allow the modules or components to achieve the same functions of the application. As the disclosed embodiments may also employ other equivalent connections, the connections illustrated and described herein are only illustrative and not intended to be limiting.

Unless clearly described in the specification or illustrated in the figures, the dimensions of each component are shown arbitrarily in the figures, and the present application is not limited to any particular dimension of any component. For clearer illustration, some components are exaggerated in size or not drawn to scale in the figures.

Use of ordinal terms such as "first", "second" and the like herein is only intended for distinguishing and labeling and does not indicate anything else. Unless particularly specified, such use does not indicate or imply any particular order or relevance. For example, use of the term "first component" does not imply the presence of a "second component". Likewise, the term "second component" does not imply the presence of a "first component".

As used herein, the singular forms "a", "and" and "the" are intended to include the plural forms as well, unless the context clearly indicates otherwise. The term "plurality" or "multiple" generally means "at least two". As used herein, the term "and/or" merely describes association of the listed items in any of three possible relationships. For example, "A and/or B" is to be taken as any of: A alone; both A and B; and B alone. In addition, as used herein, the slash "/" generally indicates that the preceding and succeeding items are associated in an "or" relationship.

The terms "comprise", "include" and any variations thereof are intended to cover non-exclusive inclusions, such that a process, method, article, or apparatus that comprises a list of elements is not necessarily limited to those elements, but may include other elements not expressly listed or inherent to such process, method, article, or apparatus. An element proceeded by "comprises a . . . " does not, without more constraints, preclude the existence of additional identical elements in the process, method, article, or apparatus that comprises the element.

FIG. 1 shows a flowchart of a method of full-field 3D displacement measurement via microwave sensing according to an embodiment of the present application. As shown in FIG. 1, the method includes the steps as follows:

Step 1: Establish a structure coordinate system (SCS) based on a target under measurement.

Figure 2:
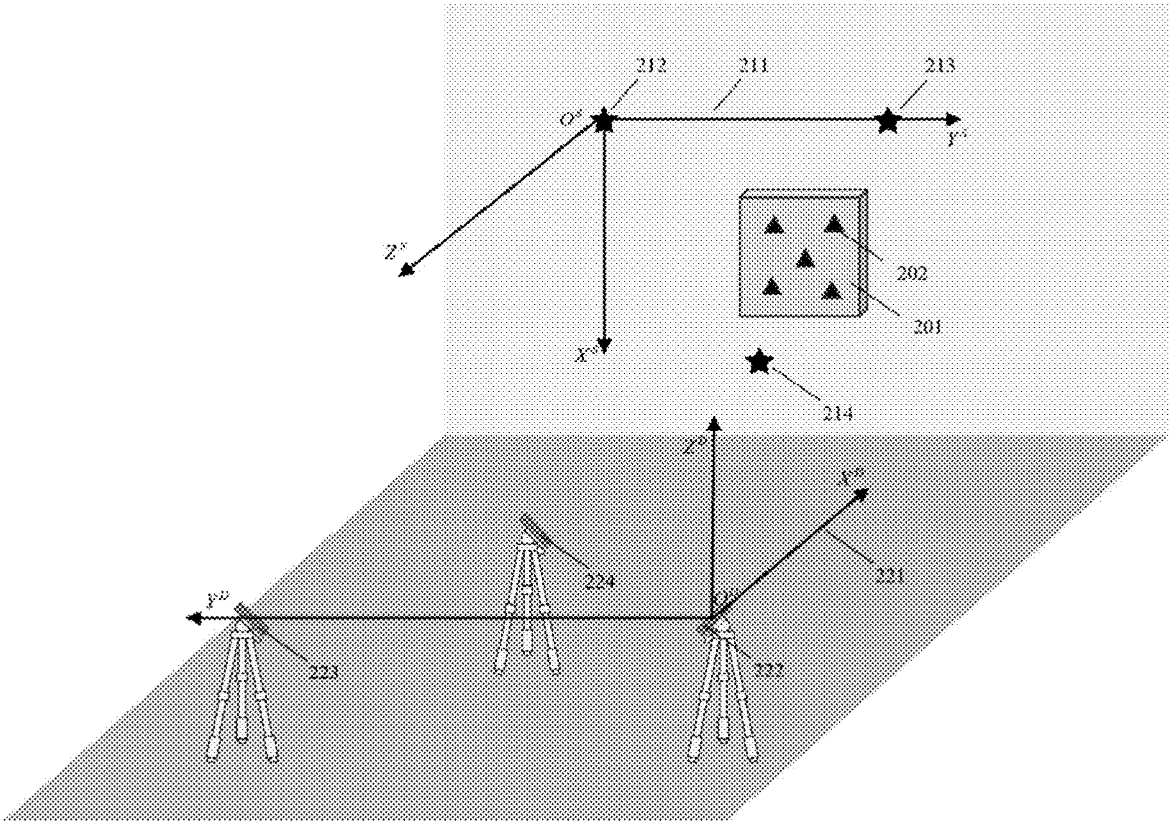
FIG. 2 schematically illustrates an SCS and DCS establishment process according to an embodiment of the present application.

As shown in FIG. 2, three calibration reference targets (e.g., a first reference target 212, a second reference target 213 and a third reference target 214) are placed in the vicinity of the target under measurement 201. Alternatively, existing targets or measuring points 202 are selected as the reference targets. The SCS 211 is then established with the reference targets.

The target under measurement refers to a discrete object under measurement, or represented by different measuring points on an object under measurement. In order to measure a displacement of the target under measurement in a certain direction, two most critical directions are chosen as displacement directions under measurement. A plane defined by the two displacement directions under measurement for the target under measurement is taken as a reference plane. The three selected reference targets are arranged non-collinearly in the reference plane and establish the SCS $O^S$-$X^SY^SZ^S$, in which the origin $O^S$ is located at the position of the first reference target 212 laterally behind the target under measurement; a positive direction of the $Y^S$ axis is a direction pointing from the first reference target 212 toward the second reference target 213; a positive direction of the $X^S$ axis is perpendicular to the positive direction of the $Y^S$ axis and points toward a half-plane where the third reference target 214 is located; and a positive direction of the $Z^S$ axis points toward a half-space where microwave transceivers are located. The reference targets are arranged so that the positive directions of the three axes follow the right-hand rule for coordinate systems.

Step 2: Establish a device coordinate system (DCS) based on a first microwave transceiver, a second microwave transceiver and a third microwave transceiver.

More than three microwave transceivers are arranged non-collinearly in front of the target under measurement, and an angle of detection of each of the microwave transceivers is adjusted so that its field of view (FoV) covers the target under measurement and the reference targets.

The DCS $O^D$-$X^DY^DZ^D$ is established based on spatial positions of the microwave transceivers, in which the first microwave transceiver 222 is chosen to define the origin $O^D$. A plane defined by the first microwave transceiver 222, the second microwave transceiver 223 and the third microwave transceiver 224 are taken as the $X^DO^DY^D$ plane of the DCS. The $Z^D$ axis is oriented perpendicular to the $X^DO^DY^D$ plane, passes through the position of the first microwave transceiver 222 and points toward the side of the target. A line connecting the first microwave transceiver 222 and the second microwave transceiver 223 defines the $Y^D$ axis of the DCS, and a positive direction of this axis is a direction pointing from the first microwave transceiver 222 toward the second microwave transceiver 223. The first microwave transceiver 222 and the second microwave transceiver 223 are selected based on the criterion that a cross product associated with the $Y^D$ and $Z^D$ axes of the DCS points toward a half-space where the third microwave transceiver 224 is located. In this way, a positive direction of the $X^D$ axis of the DCS is determined by the cross product associated with the $Y^D$ and $Z^D$ axes and passes through the position of the first microwave transceiver 222.

Step 3: Monitor displacement time series of the target under measurement by the first microwave transceiver, the second microwave transceiver and the third microwave transceiver and obtain initial 3D displacement time series of the target under measurement in the DCS.

All the microwave transceivers are controlled to simultaneously transmit frequency-modulation continuous-wave (FMCW) microwave signals toward a measuring point q and receive corresponding echo signals. Initial displacement time series of the measuring point q in light-of-sight (LoS) directions are extracted from baseband signals of the microwave transceivers and denoted as $$dR_q^p(mT),$$

where m is the index number of an equivalent displacement sampling period and m=1, 2, . . . ; T is a length of time of the equivalent displacement sampling period; and p is the index number of the first microwave transceiver, the second microwave transceiver or the third microwave transceiver and p=A, B, C, . . . .

Subsequently, initial displacement time series of the measuring point q along the axes of the DCS are calculated as $$dx_q^D(mT),\ dy_q^D(mT),\ dz_q^D(mT).$$

Step 4: Derive a coordinate transformation relationship from the DCS to the SCS based on the DCS and the SCS.

The coordinate transformation relationship includes rotation and translation matrices from the DCS to the SCS. The rotation matrix R and the translation matrix t may be derived using various methods including standard orthogonal basis transformation, singular value decomposition and a quaternion-based method. Optionally, the rotation matrix R and the translation matrix t may be derived using standard orthogonal basis transformation.

A standard orthogonal basis of the SCS can be expressed as $$\vec{e_1}=\begin{pmatrix}1\\0\\0\end{pmatrix},\ \vec{e_2}=\begin{pmatrix}0\\1\\0\end{pmatrix},\ \vec{e_3}=\begin{pmatrix}0\\0\\1\end{pmatrix},$$

and a standard orthogonal basis of the DCS as $$\vec{f_1}=\vec{x_0^D},\ \vec{f_2}=\vec{y_0^D},\ \vec{f_3}=\vec{z_0^D},$$

where $$\vec{x_0^D},\ \vec{y_0^D},\ \vec{z_0^D}$$

represent unit vectors of the $O^DX^D$, $O^DY^D$, $O^DZ^D$ directions of the DCS. $\vec{f_1}$, $\vec{f_2}$, $\vec{f_3}$ can be expressed as the following linear combinations of $\vec{e_1}$, $\vec{e_2}$, $\vec{e_3}$:

$$\vec{f_1}=\vec{x_0^D}=p_{11}\vec{e_1}+p_{12}\vec{e_2}+p_{13}\vec{e_3}=\begin{pmatrix}p_{11}\\p_{12}\\p_{13}\end{pmatrix},$$

$$\vec{f_2}=\vec{y_0^D}=p_{21}\vec{e_1}+p_{22}\vec{e_2}+p_{23}\vec{e_3}=\begin{pmatrix}p_{21}\\p_{22}\\p_{23}\end{pmatrix},$$

$$\vec{f_3}=\vec{z_0^D}=p_{31}\vec{e_1}+p_{32}\vec{e_2}+p_{33}\vec{e_3}=\begin{pmatrix}p_{31}\\p_{32}\\p_{33}\end{pmatrix}.$$

where $p_{ij}$(i, j=1, 2, 3) represents a basis transformation coefficient.

Coordinates of the microwave transceiver A in the SCS are $$(xDev_A^S,\ yDev_A^S,\ zDev_A^S),$$

coordinates of the microwave transceiver B in the SCS are $$(xDev_B^S,\ yDev_B^S,\ zDev_B^S),$$

and coordinates of the microwave transceiver C in the SCS are $$(xDev_C^S,\ yDev_C^S,\ zDev_C^S).$$

Assuming $$\overrightarrow{coor_A}=(xDev_A^S,\ yDev_A^S,\ zDev_A^S)^T,$$

$$\overrightarrow{coor_B}=(xDev_B^S,\ yDev_B^S,\ zDev_B^S)^T,$$

$$\overrightarrow{coor_C}=(xDev_C^S,\ yDev_C^S,\ zDev_C^S)^T,$$

where $(*)^T$ represents a transpose of the matrix, then $$\vec{f_2}=\frac{\overrightarrow{coor_B}-\overrightarrow{coor_A}}{|\overrightarrow{coor_B}-\overrightarrow{coor_A}|},$$

$$\vec{f_3}=\frac{(\overrightarrow{coor_C}-\overrightarrow{coor_A})\times\vec{f_2}}{|\overrightarrow{coor_C}-\overrightarrow{coor_A}|},$$

$$\vec{f_1}=\vec{f_2}\times\vec{f_3}.$$

Thus, the rotation matrix R from the DCS to the SCS is obtained as $$R=[\vec{f_1}\ \ \vec{f_2}\ \ \vec{f_3}],$$

and the translation matrix t from the DCS to the SCS as $$t=(xDev_A^S,\ yDev_A^S,\ zDev_A^S)^T.$$

For the measuring point q, from the rotation matrix R and the translation matrix t, we can obtain:

$$\begin{pmatrix}x_q^S\\y_q^S\\z_q^S\end{pmatrix}=R\begin{pmatrix}x_q^D\\y_q^D\\z_q^D\end{pmatrix}+t,$$

where $$\begin{pmatrix}x_q^S\\y_q^S\\z_q^S\end{pmatrix}$$

represents coordinates of the measuring point q in the SCS, and $$\begin{pmatrix}x_q^D\\y_q^D\\z_q^D\end{pmatrix}$$

represents coordinates of the measuring point q in the DCS.

Step 5: Based on the coordinate transformation relationship and the initial 3D displacement time series, calculate transformed 3D displacement time series of the target under measurement in the SCS.

Based on the coordinate transformation relationship $$\begin{pmatrix}x_q^S\\y_q^S\\z_q^S\end{pmatrix}=R\begin{pmatrix}x_q^D\\y_q^D\\z_q^D\end{pmatrix}+t,$$

the initial displacement time series $$dx_q^D(mT),\ dy_q^D(mT),\ dz_q^D(mT)$$

of the measuring point q along the axes of the DCS (where $$dx_q^D(mT)$$

is the initial displacement time series of the measuring point q along the X axis of the DCS;

$$dy_q^D(mT)$$

is the initial displacement time series of the measuring point q along the Y axis of the DCS;

$$dz_q^D(mT)$$

is the initial displacement time series of the measuring point q along the Z axis of the DCS; m is the index number of an equivalent displacement sampling period and m=1, 2, . . . ; and T is the length of time of the equivalent displacement sampling period) are converted into the transformed displacement time series $$dx_q^S(mT)$$

along the X axis of the SCS, the transformed displacement time series $$dy_q^S(mT),$$

along the Y axis of the SCS, and the transformed displacement time series $$dz_q^S(mT)$$

along the Z axis of the SCS, of the measuring point q:

$$\begin{cases} dx_q^S = p_{11}dx_q^D + p_{21}dy_q^D + p_{31}dz_q^D \\ dy_q^S = p_{12}dx_q^D + p_{22}dy_q^D + p_{32}dz_q^D \\ dz_q^S = p_{13}dx_q^D + p_{23}dy_q^D + p_{33}dz_q^D \end{cases}.$$

Within the scope of the present application, how the transformed 3D displacement time series in the SCS are used and what they reflect depend on post-processing in different applications.

Figure 3:
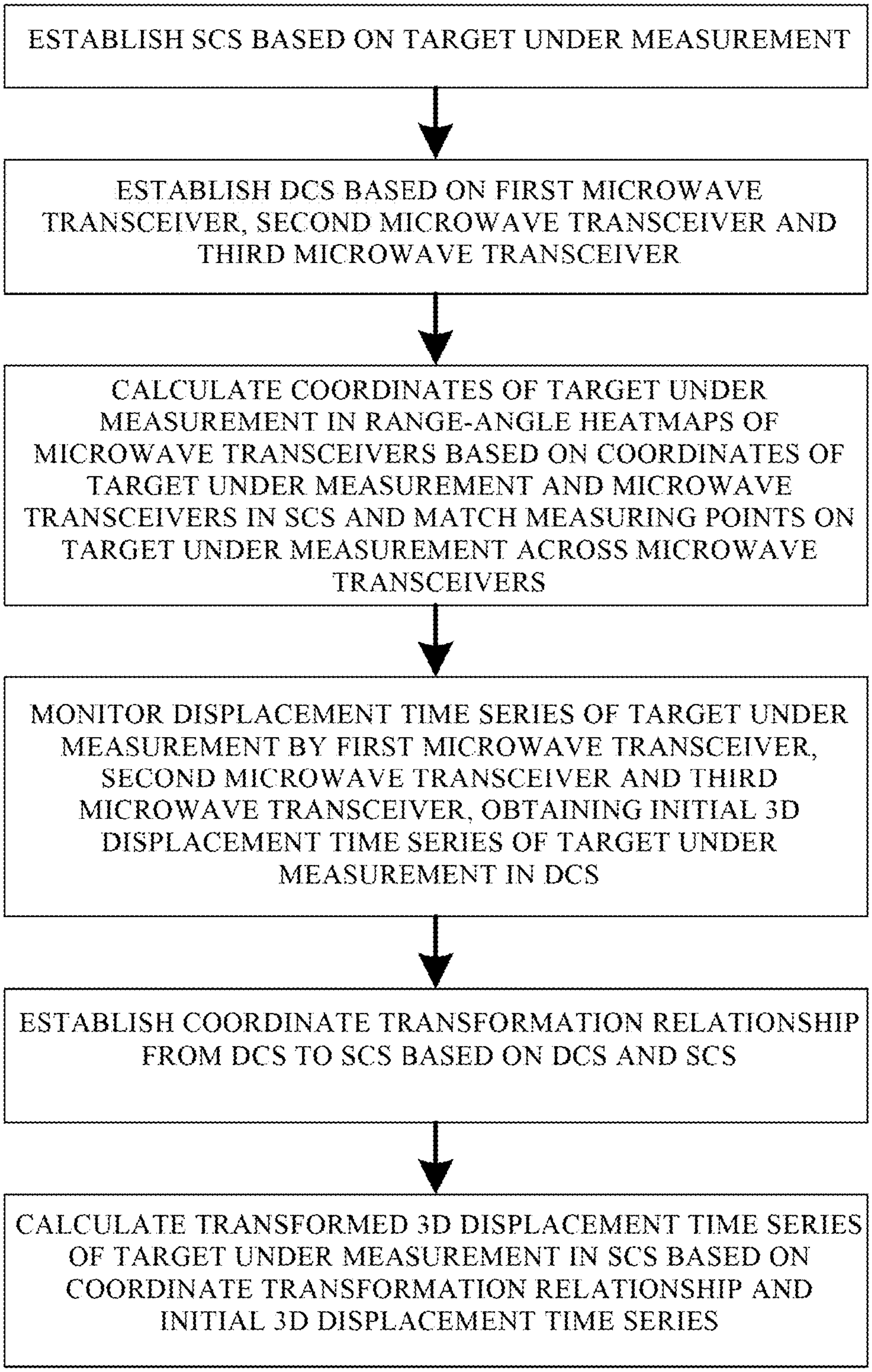
FIG. 3 shows a flowchart of a method of full-field 3D displacement measurement via microwave sensing according to another embodiment of the present application.
Figure 4:
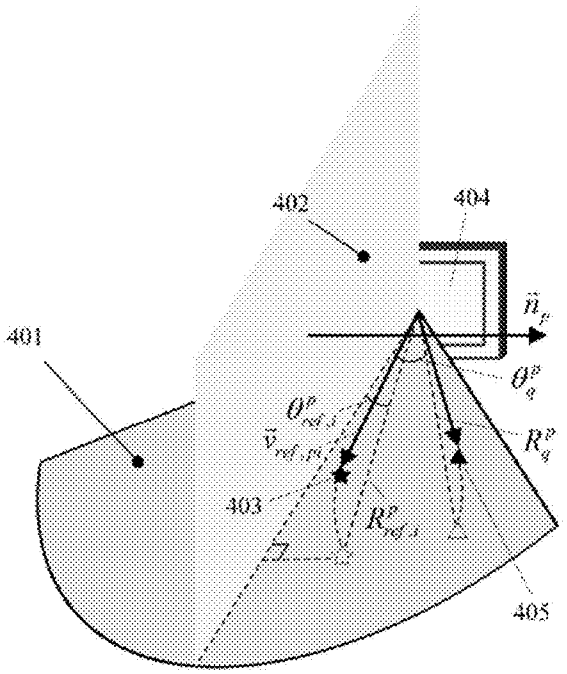
FIG. 4 schematically illustrates a microwave range-angle heatmap of a microwave transceiver according to an embodiment of the present application.

FIG. 3 is a flowchart of a method of full-field 3D displacement measurement via microwave sensing according to another embodiment of the present application. This method may further include the step of, based on the target under measurement and the coordinates of the microwave transceivers in the SCS, calculating coordinates of the target under measurement in range-angle heatmaps of the microwave transceivers and matching measuring points on the target under measurement across the microwave transceivers.

As shown in FIG. 3, the method includes the steps as follows:

Step 1: Establish an SCS based on a target under measurement.

Three or more calibration reference targets are placed in the vicinity of the target under measurement. Alternatively, existing targets or measuring points in an FoV are selected as the reference targets. The SCS $O^S$-$X^SY^SZ^S$ is then established with the reference targets.

Two displacement directions under measurement are selected for the target under measurement, and a plane defined by these directions is taken as a reference plane. Three non-collinear ones of the reference targets within the reference plane are chosen to establish the SCS, in which the origin $O^S$ is located at the position of a first reference target laterally behind the target under measurement; a positive direction of the $Y^S$ axis is a direction pointing from the first reference target toward a second reference target; a positive direction of the $X^S$ axis is perpendicular to the positive direction of the $Y^S$ axis and points toward a half-plane where a third reference target is located; and a positive direction of the $Z^S$ axis points toward a half-space where microwave transceivers are located. The reference targets are arranged so that the positive directions of the three axes follow the right-hand rule for coordinate systems.

Step 2: Establish a DCS based on a first microwave transceiver, a second microwave transceiver and a third microwave transceiver.

Three or more microwave transceivers are arranged non-collinearly in front of the target under measurement, and an angle of detection of each of the microwave transceivers is adjusted so that its FoV covers the target under measurement and the reference targets.

The DCS $O^D$-$X^DY^DZ^D$ is established based on spatial positions of the microwave transceivers, in which the first microwave transceiver is chosen to define the origin $O^D$. A plane defined by the first microwave transceiver, the second microwave transceiver and the third microwave transceiver are taken as the $X^DO^DY^D$ plane of the DCS. The $Z^D$ axis is oriented perpendicular to the $X^DO^DY^D$ plane, passes through the position of the first microwave transceiver and points toward the side of the target. A line connecting the first microwave transceiver and the second microwave transceiver defines the $Y^D$ axis of the DCS, and a positive direction of this axis is a direction pointing from the first microwave transceiver toward the second microwave transceiver. The first microwave transceiver and the second microwave transceiver are selected based on the criterion that a cross product associated with the $Y^D$ and $Z^D$ axes of the DCS points toward a half-space where the third microwave transceiver is located. In this way, a positive direction of the $X^D$ axis of the DCS is determined by the cross product associated with the $Y^D$ and $Z^D$ axes and passes through the position of the first microwave transceiver.

Step 3: Calculate coordinates of the target under measurement in range-angle heatmaps of the microwave transceivers based on coordinates of the target under measurement and the microwave transceivers in the SCS and match measuring points on the target under measurement across the microwave transceivers.

Coordinates of a measuring point q in the SCS can be expressed as $$\left(x_q^S, y_q^S, z_q^S\right),$$

and a vector matrix pointing from a p-th (p=A, B, C) one of the microwave transceivers toward the three reference targets as:

$$\vec{v}_{ref,p=} = \begin{bmatrix} \vec{v}_{ref,p1} \\ \vec{v}_{ref,p2} \\ \vec{v}_{ref,p3} \end{bmatrix} = \begin{bmatrix} x_{ref,1}^S - xDev_p^S & y_{ref,1}^S - yDev_p^S & Z_{ref,1}^S - zDev_p^S \\ x_{ref,2}^S - xDev_p^S & y_{ref,2}^S - yDev_p^S & Z_{ref,2}^S - zDev_p^S \\ x_{ref,3}^S - xDev_p^S & y_{ref,3}^S - yDev_p^S & Z_{ref,3}^S - zDev_p^S \end{bmatrix} (p = A, B, C),$$

where $$\left(x_{ref,1}^S, y_{ref,1}^S, z_{ref,1}^S\right), \left(x_{ref,2}^S, y_{ref,2}^S, z_{ref,2}^S\right), \left(x_{ref,3}^S, y_{ref,3}^S, z_{ref,3}^S\right)$$

are coordinates of the three reference targets 403 in the SCS. The coordinates of the microwave transceiver A in the SCS are $$\left(xDev_A^S, yDev_A^S, zDev_A^S\right),$$

the coordinates of the microwave transceiver B in the SCS are $$\left(xDev_B^S, yDev_B^S, zDev_B^S\right),$$

and the coordinates of the microwave transceiver C in the SCS are $$\left(xDev_C^S, yDev_C^S, zDev_C^S\right).$$

The coordinates of the measuring point q 405 in the range-angle heatmap 401 of the p-th microwave transceiver 404 are $$\left(R_q^p, \theta_q^p\right),$$

where $$R_q^p$$

denotes a range coordinate of the measuring point q in the range-angle heatmap of the p-th microwave transceiver;

$$\theta_q^p$$

represents an angle coordinate of the measuring point q in the range-angle heatmap of the p-th microwave transceiver; and p is the index number of the microwave transceiver and p=A, B, C, . . . .

Denoting a unit normal vector of a zero-degree plane 402 of the range-angle heatmap of the p-th (p=A, B, C) microwave transceiver as $\vec{n}_p$ (p=A, B, C), because $$\begin{cases} \vec{v}_{ref,p1} \cdot \vec{n}_p = R_{ref,1}^p \sin\left(\theta_{ref,1}^p\right) \\ \vec{v}_{ref,p2} \cdot \vec{n}_p = R_{ref,2}^p \sin\left(\theta_{ref,2}^p\right) (p = A, B, C), \\ \vec{v}_{ref,p3} \cdot \vec{n}_p = R_{ref,3}^p \sin\left(\theta_{ref,3}^p\right) \end{cases}$$

we can obtain $$\vec{n}_p = \left(\vec{v}_{ref,p}\right)^{-1} \cdot \begin{bmatrix} R_{ref,1}^p \sin\left(\theta_{ref,1}^p\right) \\ R_{ref,2}^p \sin\left(\theta_{ref,2}^p\right) \\ R_{ref,3}^p \sin\left(\theta_{ref,3}^p\right) \end{bmatrix} (p = A, B, C).$$

Thus, the range coordinate $$R_q^p$$

and the angle coordinate $$\theta_q^p$$

of the measuring point q in the range-angle heatmap of the p-th (p=A, B, C) microwave transceiver can be calculated as:

$$R_q^p = \sqrt{\left(x_q^S - xDev_p^S\right)^2 + \left(y_q^S - yDev_p^S\right)^2 + \left(z_q^S - zDev_p^S\right)^2}$$

$$\theta_q^p = \arcsin\left(\frac{\left(x_q^S - xDev_p^S, y_q^S - yDev_p^S, z_q^S - zDev_p^S\right) \cdot \vec{n}_p}{\left\|\left(x_q^S - xDev_p^S, y_q^S - yDev_p^S, z_q^S - zDev_p^S\right)\right\|}\right).$$

In this way, the coordinates of the measuring point q on the target under measurement in the range-angle heatmaps of the microwave transceivers can be obtained.

Step 4: Monitor displacement time series of the target under measurement by the first microwave transceiver, the second microwave transceiver and the third microwave transceiver and obtain initial 3D displacement time series of the target under measurement in the DCS.

All the microwave transceivers are controlled to simultaneously transmit FMCW microwave signals toward the measuring point q and receive corresponding echo signals. Initial displacement time series in LoS directions are extracted from baseband signals of the microwave transceivers and denoted as $$dR_q^p(mT),$$

where m is the index number of an equivalent displacement sampling period and m=1, 2, . . . ; T is a length of time of the equivalent displacement sampling period; and p is the index number of the microwave transceiver and p=A, B, C, . . . .

After that, initial displacement time series of the measuring point q along the axes of the DCS are calculated as $$dx_q^D(mT),\ dy_q^D(mT),\ dz_q^D(mT).$$

Step 5: Derive a coordinate transformation relationship from the DCS to the SCS based on the DCS and the SCS.

The coordinate transformation relationship includes rotation and translation matrices from the DCS to the SCS. The rotation matrix R and the translation matrix t may be derived using various methods including standard orthogonal basis transformation, singular value decomposition and a quaternion-based method. Optionally, the rotation matrix R and the translation matrix t may be derived using standard orthogonal basis transformation.

A standard orthogonal basis of the SCS can be expressed as $$\vec{e_1} = \begin{pmatrix}1\\0\\0\end{pmatrix},\ \vec{e_2} = \begin{pmatrix}0\\1\\0\end{pmatrix},\ \vec{e_3} = \begin{pmatrix}0\\0\\1\end{pmatrix},$$

and a standard orthogonal basis of the DCS as $$\vec{f_1} = \vec{x_0^D},\ \vec{f_2} = \vec{y_0^D},\ \vec{f_3} = \vec{z_0^D},$$

where $$\vec{x_0^D},\ \vec{y_0^D},\ \vec{z_0^D},$$

represent unit vectors of the $O^DX^D$, $O^DY^D$, $O^DZ^D$ directions of the DCS. $\vec{f_1}$, $\vec{f_2}$, $\vec{f_3}$ can be expressed as the following linear combinations of $\vec{e_1}$, $\vec{e_2}$, $\vec{e_3}$:

$$\vec{f_1} = \vec{x_0^D} = p_{11}\vec{e_1} + p_{12}\vec{e_2} + p_{13}\vec{e_3} = \begin{pmatrix}p_{11}\\p_{12}\\p_{13}\end{pmatrix},$$

-continued $$\vec{f_2} = \vec{y_0^D} = p_{21}\vec{e_1} + p_{22}\vec{e_2} + p_{23}\vec{e_3} = \begin{pmatrix}p_{21}\\p_{22}\\p_{23}\end{pmatrix},$$

$$\vec{f_3} = \vec{z_0^D} = p_{31}\vec{e_1} + p_{32}\vec{e_2} + p_{33}\vec{e_3} = \begin{pmatrix}p_{31}\\p_{32}\\p_{33}\end{pmatrix}.$$

where $p_{ij}$(i, j=1, 2, 3) represents a basis transformation coefficient, where i and j are subscripts of the coefficient.

Assuming $$\overrightarrow{coor_A} = (xDev_A^S,\ yDev_A^S,\ zDev_A^S)^T,$$

$$\overrightarrow{coor_B} = (xDev_B^S,\ yDev_B^S,\ zDev_B^S)^T,$$

$$\overrightarrow{coor_C} = (xDev_C^S,\ yDev_C^S,\ zDev_C^S)^T,$$

where $(*)^T$ represents a transpose of the matrix, then $$\vec{f_2} = \frac{\overrightarrow{coor_B} - \overrightarrow{coor_A}}{|\overrightarrow{coor_B} - \overrightarrow{coor_A}|},$$

$$\vec{f_3} = \frac{(\overrightarrow{coor_C} - \overrightarrow{coor_A}) \times \vec{f_2}}{|\overrightarrow{coor_C} - \overrightarrow{coor_A}|},$$

$$\vec{f_1} = \vec{f_2} \times \vec{f_3}.$$

Thus, the rotation matrix R from the DCS to the SCS is obtained as $$\boldsymbol{R} = [\vec{f_1}\ \vec{f_2}\ \vec{f_3}],$$

and the translation matrix t from the DCS to the SCS as $$\boldsymbol{t} = (xDev_A^S,\ yDev_A^S,\ zDev_A^S)^T.$$

For the measuring point q, from the rotation matrix R and the translation matrix t, we can obtain:

$$\begin{pmatrix}x_q^S\\y_q^S\\z_q^S\end{pmatrix} = \boldsymbol{R}\begin{pmatrix}x_q^D\\y_q^D\\z_q^D\end{pmatrix} + \boldsymbol{t},$$

where $$\begin{pmatrix}x_q^S\\y_q^S\\z_q^S\end{pmatrix}$$

represents coordinates of the measuring point q in the SCS, and $$\begin{pmatrix} x_q^D \\ y_q^D \\ z_q^D \end{pmatrix}$$

represents coordinates of the measuring point q in the DCS.

Step 6: Based on the coordinate transformation relationship and the initial 3D displacement time series, calculate transformed 3D displacement time series of the target under measurement in the SCS.

Based on the coordinate transformation relationship $$\begin{pmatrix} x_q^S \\ y_q^S \\ z_q^S \end{pmatrix} = \boldsymbol{R} \begin{pmatrix} x_q^D \\ y_q^D \\ z_q^D \end{pmatrix} + \boldsymbol{t},$$

the initial displacement time series $$dx_q^D(mT),\ dy_q^D(mT),\ dz_q^D(mT)$$

of the measuring point q along the axes of the DCS (where $$dx_q^D(mT)$$

is the initial displacement time series of the measuring point q along the X axis of the DCS, $$dy_q^D(mT)$$

is the initial displacement time series of the measuring point q along the Y axis of the DCS, and $$dz_q^D(mT)$$

is the initial displacement time series of the measuring point q along the Z axis of the DCS) are converted into the transformed displacement time series $$dx_q^S(mT)$$

along the X axis of the SCS, the transformed displacement time series $$dy_q^S(mT),$$

along the Y axis of the SCS, and the transformed displacement time series $$dz_q^S(mT)$$

along the Z axis of the SCS, of the measuring point q:

$$\begin{cases} dx_q^S = p_{11}dx_q^D + p_{21}dy_q^D + p_{31}dz_q^D \\ dy_q^S = p_{12}dx_q^D + p_{22}dy_q^D + p_{32}dz_q^D \\ dz_q^S = p_{13}dx_q^D + p_{23}dy_q^D + p_{33}dz_q^D \end{cases}.$$

A method according to another embodiment of the present application is capable of 3D vibrational, deformational and other displacement measurement of multiple measuring points or all measuring points in a field. The method includes the steps as follows:

Step 1: Establish an SCS based on a target under measurement.

Three or more calibration reference targets are placed in the vicinity of the target under measurement. Alternatively, existing targets or measuring points in an FoV are selected as the reference targets. The SCS $O^S$-$X^SY^SZ^S$ is then established with the reference targets.

Two displacement directions under measurement are selected for the target under measurement, and a plane defined by these directions is taken as a reference plane. Three non-collinear ones of the reference targets within the reference plane are chosen to establish the SCS, in which the origin $O^S$ is located at the position of a first reference target laterally behind the target under measurement; a positive direction of the $Y^S$ axis is a direction pointing from the first reference target toward a second reference target; a positive direction of the $X^S$ axis is perpendicular to the positive direction of the $Y^S$ axis and points toward a half-plane where a third reference target is located; and a positive direction of the $Z^S$ axis points toward a half-space where microwave transceivers are located. The reference targets are arranged so that the positive directions of the three axes follow the right-hand rule for coordinate systems.

Step 2: Establish a DCS based on a first microwave transceiver, a second microwave transceiver and a third microwave transceiver.

Three or more microwave transceivers are arranged non-collinearly in front of the target under measurement, and an angle of detection of each of the microwave transceivers is adjusted so that its FoV covers the target under measurement and the reference targets.

The DCS $O^D$-$X^DY^DZ^D$ is established based on spatial positions of the microwave transceivers, in which the first microwave transceiver is chosen to define the origin $O^D$. A plane defined by the first microwave transceiver, the second microwave transceiver and the third microwave transceiver are taken as the $X^DO^DY^D$ plane of the DCS. The $Z^D$ axis is oriented perpendicular to the $X^DO^DY^D$ plane, passes through the position of the first microwave transceiver and points toward the side of the target. A line connecting the first microwave transceiver and the second microwave transceiver defines the $Y^D$ axis of the DCS, and a positive direction of this axis is a direction pointing from the first microwave transceiver toward the second microwave transceiver. The first microwave transceiver and the second microwave transceiver are selected based on the criterion that a cross product associated with the $Y^D$ and $Z^D$ axes of the DCS points toward a half-space where the third microwave transceiver is located. In this way, a positive direction of the $X^D$ axis of the DCS is determined by the cross product associated with the $Y^D$ and $Z^D$ axes and passes through the position of the first microwave transceiver.

Step 3: Calculate coordinates of the target under measurement in range-angle heatmaps of the microwave transceivers based on coordinates of the target under measurement and the microwave transceivers in the SCS and match measuring points on the target under measurement across the microwave transceivers.

The target under measurement refers to a discrete object under measurement, or represented by different measuring points on an object under measurement. Hereinafter, the target under measurement is described as being represented by measuring points, which are numbered as q=1, 2, 3, . . . .

Coordinates of a q-th measuring point in the SCS can be denoted as $$\left(x_q^S, y_q^S, z_q^S\right),$$

and a vector matrix pointing from a p-th (p=A, B, C) one of the microwave transceivers toward the three reference targets as:

$$\vec{v}_{ref,p} = \begin{bmatrix} \vec{v}_{ref,p1} \\ \vec{v}_{ref,p2} \\ \vec{v}_{ref,p3} \end{bmatrix} = \begin{bmatrix} x_{ref,1}^S - xDev_p^S & y_{ref,1}^S - yDev_p^S & Z_{ref,1}^S - zDev_p^S \\ x_{ref,2}^S - xDev_p^S & y_{ref,2}^S - yDev_p^S & Z_{ref,2}^S - zDev_p^S \\ x_{ref,3}^S - xDev_p^S & y_{ref,3}^S - yDev_p^S & Z_{ref,3}^S - zDev_p^S \end{bmatrix} (p = A, B, C),$$

where $$\left(x_{ref,1}^S, y_{ref,1}^S, z_{ref,1}^S\right), \left(x_{ref,2}^S, y_{ref,2}^S, z_{ref,2}^S\right), \left(x_{ref,3}^S, y_{ref,3}^S, z_{ref,3}^S\right)$$

are coordinates of the three reference targets in the SCS. The coordinates of the microwave transceiver A in the SCS are $$\left(xDev_A^S, yDev_A^S, zDev_A^S\right),$$

the coordinates of the microwave transceiver B in the SCS are $$\left(xDev_B^S, yDev_B^S, zDev_B^S\right),$$

and the coordinates of the microwave transceiver C in the SCS are $$\left(xDev_C^S, yDev_C^S, zDev_C^S\right).$$

Coordinates of the q-th measuring point in the range-angle heatmap of the p-th microwave transceiver are $$\left(R_q^p, \theta_q^p\right),$$

where $$R_q^p$$

denotes a range coordinate of the q-th measuring point in the range-angle heatmap of the p-th microwave transceiver;

$$\theta_q^p$$

represents an angle coordinate of the q-th measuring point in the range-angle heatmap of the p-th microwave transceiver; and p is the index number of the microwave transceiver and p=A, B, C, . . . .

Denoting a unit normal vector of a zero-degree plane of the range-angle heatmap of the p-th (p=A, B, C) microwave transceiver as $\vec{n}_p$ (p=A, B, C), because $$\begin{cases} \vec{v}_{ref,p1} \square \vec{n}_p = R_{ref,1}^p \sin\left(\theta_{ref,1}^p\right) \\ \vec{v}_{ref,p2} \square \vec{n}_p = R_{ref,2}^p \sin\left(\theta_{ref,2}^p\right) (p = A, B, C), \\ \vec{v}_{ref,p3} \square \vec{n}_p = R_{ref,3}^p \sin\left(\theta_{ref,3}^p\right) \end{cases}$$

we can obtain $$\vec{n}_p = \left(\vec{v}_{ref,p}\right)^{-1} \square \begin{bmatrix} R_{ref,1}^p \sin\left(\theta_{ref,1}^p\right) \\ R_{ref,2}^p \sin\left(\theta_{ref,2}^p\right) \\ R_{ref,3}^p \sin\left(\theta_{ref,3}^p\right) \end{bmatrix} (p = A, B, C).$$

Thus, the range coordinate $$R_q^p$$

and the angle coordinate $$\theta_q^p$$

of the q-th measuring point in the range-angle heatmap of the p-th (p=A, B, C) microwave transceiver can be calculated as:

$$R_q^p = \sqrt{\left(x_q^S - xDev_p^S\right)^2 + \left(y_q^S - yDev_p^S\right)^2 + \left(z_q^S - zDev_p^S\right)^2}$$

$$\theta_q^p = \arcsin\left(\frac{\left(x_q^S - xDev_p^S, y_q^S - yDev_p^S, z_q^S - zDev_p^S\right) \square \vec{n}_p}{\left\| \left(x_q^S - xDev_p^S, y_q^S - yDev_p^S, z_q^S - zDev_p^S\right) \right\|}\right).$$

The above steps may be repeated to determine the coordinates of each measuring point in the range-angle heatmaps of the microwave transceivers.

Step 4: Monitor displacement time series of the target under measurement by the first microwave transceiver, the second microwave transceiver and the third microwave transceiver and obtain initial 3D displacement time series of the target under measurement in the DCS.

All the microwave transceivers are controlled to simultaneously transmit FMCW microwave signals toward multiple measuring points or all the measuring points in the field and receive corresponding echo signals. Initial displacement time series of the q-th measuring point in LoS directions are extracted from baseband signals of the microwave transceivers and denoted as $$dR_q^p(mT),$$

where m is the index number of an equivalent displacement sampling period and m=1, 2, . . . ; T is a length of time of the equivalent displacement sampling period; and p is the index number of the microwave transceiver and p=A, B, C, . . . .

Next, initial displacement time series of the q-th measuring point along the axes of the DCS are calculated as $$dx_q^D(mT),\ dy_q^D(mT),\ dz_q^D(mT).$$

Step 5: Derive a coordinate transformation relationship from the DCS to the SCS based on the DCS and the SCS.

The coordinate transformation relationship includes rotation and translation matrices from the DCS to the SCS. The rotation matrix R and the translation matrix t may be derived using various methods including standard orthogonal basis transformation, singular value decomposition and a quaternion-based method. Optionally, the rotation matrix R and the translation matrix t may be derived using standard orthogonal basis transformation.

A standard orthogonal basis of the SCS can be expressed as $$\vec{e_1} = \begin{pmatrix} 1 \\ 0 \\ 0 \end{pmatrix},\quad \vec{e_2} = \begin{pmatrix} 0 \\ 1 \\ 0 \end{pmatrix},\quad \vec{e_3} = \begin{pmatrix} 0 \\ 0 \\ 1 \end{pmatrix},$$

and a standard orthogonal basis of the DCS as $$\vec{f_1} = \vec{x_0^D},\ \vec{f_2} = \vec{y_0^D},\ \vec{f_3} = \vec{z_0^D},$$

where $$\vec{x_0^D},\ \vec{y_0^D},\ \vec{z_0^D}$$

represent unit vectors of the $O^DX^D$, $O^DY^D$, $O^DZ^D$ directions of the DCS. $\vec{f_1}$, $\vec{f_2}$, $\vec{f_3}$ can be expressed as the following linear combinations of $\vec{e_1}$, $\vec{e_2}$, $\vec{e_3}$:

$$\vec{f_1} = \vec{x_0^D} = p_{11}\vec{e_1} + p_{12}\vec{e_2} + p_{13}\vec{e_3} = \begin{pmatrix} p_{11} \\ p_{12} \\ p_{13} \end{pmatrix},$$

$$\vec{f_2} = \vec{y_0^D} = p_{21}\vec{e_1} + p_{22}\vec{e_2} + p_{23}\vec{e_3} = \begin{pmatrix} p_{21} \\ p_{22} \\ p_{23} \end{pmatrix},$$

$$\vec{f_3} = \vec{z_0^D} = p_{31}\vec{e_1} + p_{32}\vec{e_2} + p_{33}\vec{e_3} = \begin{pmatrix} p_{31} \\ p_{32} \\ p_{33} \end{pmatrix}.$$

where $p_{ij}$(i, j=1, 2, 3) represents a basis transformation coefficient.

Assuming $$\overrightarrow{coor_A} = \left(xDev_A^S,\ yDev_A^S,\ zDev_A^S\right)^T,$$

$$\overrightarrow{coor_B} = \left(xDev_B^S,\ yDev_B^S,\ zDev_B^S\right)^T,$$

$$\overrightarrow{coor_C} = \left(xDev_C^S,\ yDev_C^S,\ zDev_C^S\right)^T,$$

where $(*)^T$ represents a transpose of the matrix, then $$\vec{f_2} = \frac{(\overrightarrow{coor_B} - \overrightarrow{coor_A})}{|\overrightarrow{coor_B} - \overrightarrow{coor_A}|},$$

$$\vec{f_3} = \frac{(\overrightarrow{coor_C} - \overrightarrow{coor_A}) \times \vec{f_2}}{|\overrightarrow{coor_C} - \overrightarrow{coor_A}|},$$

$$\vec{f_1} = \vec{f_2} \times \vec{f_3}.$$

Thus, the rotation matrix R from the DCS to the SCS is obtained as $$R = \left[\vec{f_1}\ \ \vec{f_2}\ \ \vec{f_3}\right],$$

and the translation matrix t from the DCS to the SCS as $$t = \left(xDev_A^S,\ yDev_A^S,\ zDev_A^S\right)^T.$$

For the q-th measuring point, from the rotation matrix R and the translation matrix t, we can obtain:

$$\begin{pmatrix} x_q^S \\ y_q^S \\ z_q^S \end{pmatrix} = R\begin{pmatrix} x_q^D \\ y_q^D \\ z_q^D \end{pmatrix} + t,$$

where $$\begin{pmatrix} x_q^S \\ y_q^S \\ z_q^S \end{pmatrix}$$

represents coordinates of the q-th measuring point in the SCS, and $$\begin{pmatrix} x_q^D \\ y_q^D \\ z_q^D \end{pmatrix}$$

represents coordinates of the q-th measuring point in the DCS.

Step 6: Based on the coordinate transformation relationship and the initial 3D displacement time series, calculate transformed 3D displacement time series of the target under measurement in the SCS.

Based on the coordinate transformation relationship $$\begin{pmatrix} x_q^S \\ y_q^S \\ z_q^S \end{pmatrix} = R\begin{pmatrix} x_q^D \\ y_q^D \\ z_q^D \end{pmatrix} + t,$$

the initial displacement time series $$dx_q^D(mT),\ dy_q^D(mT),\ dz_q^D(mT)$$

of the q-th measuring point along the axes of the DCS (where $$dx_q^D(mT)$$

is the initial displacement time series of the q-th measuring point along the X axis of the DCS, $$dy_q^D(mT)$$

is the initial displacement time series of the q-th measuring point along the Y axis of the DCS, and $$dz_q^D(mT)$$

is the initial displacement time series of the q-th measuring point along the Z axis of the DCS) are converted into the transformed displacement time series $$dx_q^S(mT)$$

along the X axis of the SCS, the transformed displacement time series $$dy_q^S(mT),$$

along the Y axis of the SCS, and the transformed displacement time series $$dz_q^S(mT)$$

along the Z axis of the SCS, of the q-th measuring point:

$$\begin{cases} dx_q^S = p_{11}dx_q^D + p_{21}dy_q^D + p_{31}dz_q^D \\ dy_q^S = p_{12}dx_q^D + p_{22}dy_q^D + p_{32}dz_q^D \\ dz_q^S = p_{13}dx_q^D + p_{23}dy_q^D + p_{33}dz_q^D \end{cases}.$$

Figure 5:
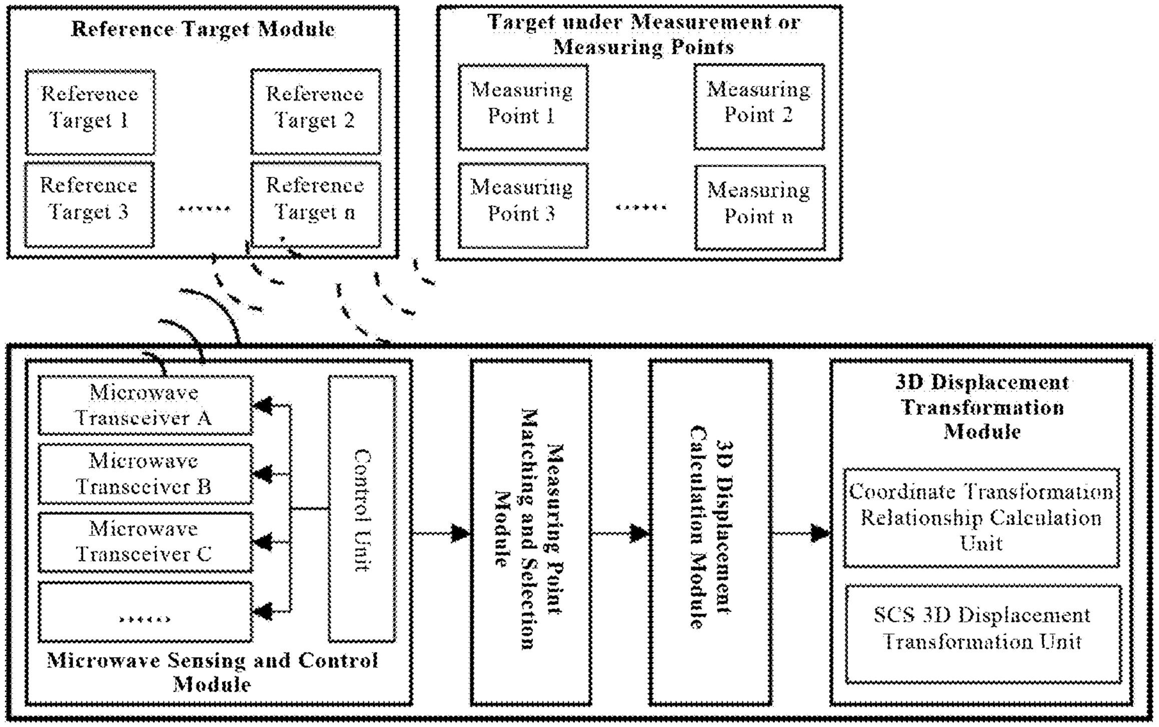
FIG. 5 is a block diagram of a system of full-field 3D displacement measurement via microwave sensing according to an embodiment of the present application.

The present application also provides a system of full-field 3D displacement measurement via microwave sensing, which can implement any of the various methods of full-field 3D displacement measurement via microwave sensing as discussed above. As shown in FIG. 5, the system includes a reference target module, a 3D displacement calculation module, a microwave sensing and control module, a coordinate transformation relationship calculation unit and an SCS 3D displacement transformation unit. The reference target module is configured to be able to establish an SCS based on a target under measurement. The 3D displacement calculation module is configured to be able to establish a DCS based on a first microwave transceiver (microwave transceiver A), a second microwave transceiver (microwave transceiver B) and a third microwave transceiver (microwave transceiver C). The microwave sensing and control module is configured to be able to monitor displacement time series of the target under measurement using the first microwave transceiver, the second microwave transceiver and the third microwave transceiver. The 3D displacement calculation module is further configured to be able to obtain initial 3D displacement time series of the target under measurement in the DCS. The coordinate transformation relationship calculation unit is configured to be able to derive a coordinate transformation relationship from the DCS to the SCS based on the DCS and the SCS. The SCS 3D displacement transformation unit is configured to be able to calculate transformed 3D displacement time series of the target under measurement in the SCS based on the coordinate transformation relationship and the initial 3D displacement time series in the DCS.

In some embodiments, the microwave sensing and control module may be further configured so that a detection FoV of the first microwave transceiver is able to cover the target under measurement, that a detection FoV of the second microwave transceiver is able to cover the target under measurement, and that a detection FoV of the third microwave transceiver is able to cover the target under measurement.

In some embodiments, the microwave sensing and control module may be further configured so that the first microwave transceiver, the second microwave transceiver and the third microwave transceiver are arranged non-collinearly.

In some embodiments, the reference target module may be further configured to be able to select two displacement directions under measurement for the target under measurement and take a plane defined by these directions as a reference target plane. A first reference target, a second reference target and a third reference target, which are non-collinear, in the reference target plane are selected to establish the SCS.

In some embodiments, the microwave sensing and control module may be further configured so that the detection FoV of the first microwave transceiver is able to cover the first reference target, that the detection FoV of the second microwave transceiver is able to cover the first reference target, that the detection FoV of the third microwave transceiver is able to cover the first reference target, that the detection FoV of the first microwave transceiver is able to cover the second reference target, that the detection FoV of the second microwave transceiver is able to cover the second reference target, the detection FoV of the third microwave transceiver is able to cover the second reference target, that the detection FoV of the first microwave transceiver is able to cover the third reference target, the detection FoV of the second microwave transceiver is able to cover the third reference target, and that the detection FoV of the third microwave transceiver is able to cover the third reference target.

In some embodiments, the reference target module may be further configured that the SCS includes an origin $O^S$, an $X^S$ axis, a $Y^S$ axis and a $Z^S$ axis. The origin $O^S$ is located at the position of the first reference target. A positive direction of the $Y^S$ axis is a direction pointing from the first reference target toward the second reference target. A positive direction of the $X^S$ axis is perpendicular to the positive direction of the $Y^S$ axis and points toward a half-plane where the third reference target is located. A positive direction of the $Z^S$ axis points toward a half-space where the first microwave transceiver, the second microwave transceiver and the third microwave transceiver are located.

In some embodiments, the system of full-field 3D displacement measurement via microwave sensing may further include a coordinate calculation unit. The coordinate calculation unit may be configured to be able to calculate coordinates of the first microwave transceiver in the SCS based on distances between the first microwave transceiver and the first reference target, the second reference target and the third reference target, respectively.

In some embodiments, the 3D displacement calculation module may be further configured to be able to establish the DCS based on coordinates of the first microwave transceiver, the second microwave transceiver and the third microwave transceiver in the SCS.

In some embodiments, the 3D displacement calculation module may be further configured so that the DCS includes an origin $O^D$, an $X^D$ axis, a $Y^D$ axis and a $Z^D$ axis. The origin $O^D$ is located at the position of the first microwave transceiver. The positions of the first microwave transceiver, the second microwave transceiver and the third microwave transceiver define an $X^DO^DY^D$ plane of the DCS. The $Z^D$ axis is perpendicular to the $X^DO^DY^D$ plane and points toward the target under measurement. A positive direction of the $Y^D$ axis is a direction pointing from the first microwave transceiver toward the second microwave transceiver. A positive direction of the $X^D$ axis points toward a half-space where the third microwave transceiver is located.

In some embodiments, the system of full-field 3D displacement measurement via microwave sensing may further include a measuring point matching and selection module. The measuring point matching and selection module may be configured to be able to calculate coordinates of the target under measurement in a range-angle heatmap of the first microwave transceiver based on coordinates of the target under measurement and the first microwave transceiver in the SCS.

In some embodiments, the measuring point matching and selection module may be further configured to be able to match measuring points on the target under measurement for the first microwave transceiver based on the coordinates of the target under measurement in the range-angle heatmap of the first microwave transceiver.

In some embodiments, the coordinate transformation relationship calculation unit may be further configured to be able to calculate the coordinate transformation relationship based on the coordinates of the first microwave transceiver in the DCS and in the SCS.

In some embodiments, the coordinate transformation relationship calculation unit may be further configured to be able to derive rotation and translation matrices from the DCS to the SCS included in the coordinate transformation relationship.

In some embodiments, the coordinate transformation relationship calculation unit may be further configured to derive the rotation and translation matrices using standard orthogonal basis transformation.

The present application also provides a device of full-field 3D displacement measurement via microwave sensing, which includes a memory, a processor and a computer program, which is stored in the memory and able to run on the processor. The processor is configured to be able to perform, when executing the computer program, the steps in any of the above discussed methods of full-field 3D displacement measurement via microwave sensing.

The present application also provides a computer-readable storage medium storing thereon a computer program, which, when executed by a processor, to perform the steps in any of the above discussed methods of full-field 3D displacement measurement via microwave sensing.

Compared with 3D displacement measurement in the DCS, 3D displacement measurement in the SCS can truly reflect response of a structure to vibration and intuitively demonstrate vibration and deformation of various portions of a structure under actual loading conditions and environments. For example, in order to monitor the health of a bridge or tall building, some critical measuring points may be particularly selected so that some coordinate axes of the SCS are parallel to critical measurement directions of the most interest. In this way, dynamic response of the structure to vehicles, winds and the like in the critical directions can be accurately reflected, facilitating long-term monitoring and trend analysis.

In addition, during the design of a mechanical structure, some portions may be required to exhibit high strength in some directions. In this case, an SCS may be established on the structure so that some of its coordinate axes are parallel to critical loading and stressing directions, and critical measuring points on the structure may be selected for vibration measurement and analysis. This can effectively facilitate performance analysis and optimization of the structure and improve its reliability. In contrast, DCS-based 3D displacement measurement often suffers from insufficiently accurate information of vibration components in critical directions, or even failure in determining vibration and deformation displacements in critical directions due to absence of information about a relative relationship between the DCS and the structure.

A method of full-field 3D displacement measurement via microwave sensing according to some embodiments includes the steps as described below.

First of all, three or more microwave transceivers are arranged, and reference targets or measuring points are selected to establish an SCS. After 3D coordinates of each microwave transceiver in the SCS are calculated, a DCS is established based on spatial positions of the multiple microwave transceivers. Subsequently, measuring points on a target or structure to be measured in the SCS are selected and mapped to derive coordinates of the target under measurement or measuring points in all range-angle heatmaps of the microwave transceivers (also called range-angle unit positions). Further, measuring points matched across the microwave transceivers are selected based on the resulting coordinates in the microwave range-angle heatmaps. All the microwave transceivers are controlled to simultaneously measure displacement time series of the target under measurement or measuring points, and 3D displacement time series of the target or measuring points in the DCS are derived. Finally, if required, a transformation relationship from the DCS to the SCS is described to calculate 3D displacement time series of the target or measuring points in the SCS.

According to the present application, 3D vibrational and deformational displacement information of all measuring points or targets within an FoV can be obtained simply with three or more reference targets or measuring points and three or more microwave transceivers. Therefore, it provides low hardware complexity and high test efficiency. In addition, through coordinate matching between the SCS and the range-angle heatmaps of the microwave transceivers, measuring points can be directly selected in the SCS established with the reference targets or measuring points and then automatically converted into the range-angle heatmaps of the different microwave transceivers, creating high convenience at production or testing sites. Finally, since the resulting 3D displacement time series are based on the user-defined SCS, flexible adjustments may be made according to the field test requirements to determine a displacement in any direction of the user's interest, circumventing the limitations associated with traditional 3D displacement measurement via microwave sensing, which arise from the reliance of a reconstructed displacement only on a coordinate system established with multiple devices.

Figure 6:
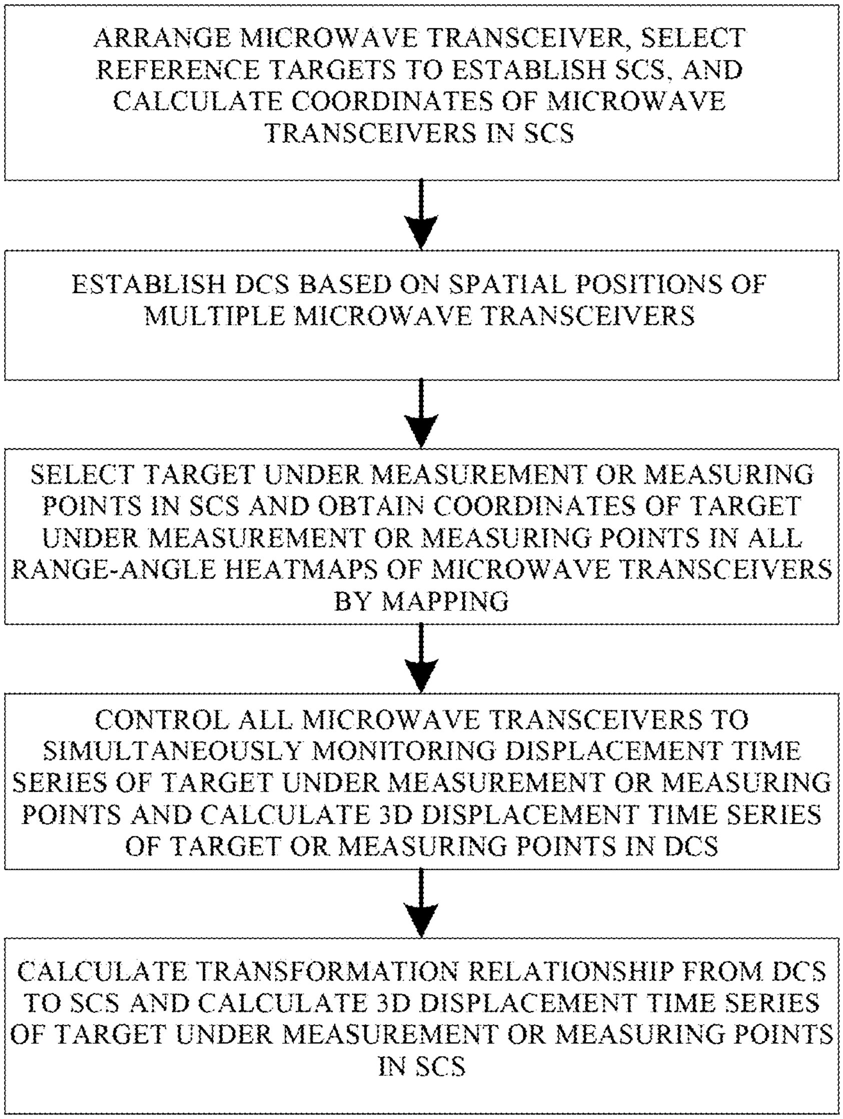
FIG. 6 shows a flowchart of a method of full-field 3D displacement measurement via microwave sensing according to yet another embodiment of the present application.

As shown in FIG. 6, a method of full-field 3D vibrational and deformational displacement measurement via microwave sensing according to some embodiments may include the steps as described below.

At first, three or more microwave transceivers are arranged, and reference targets or measuring points are selected to establish an SCS. 3D coordinates of each microwave transceiver in the SCS are calculated. Subsequently, a DCS is established based on spatial positions of the multiple microwave transceivers. Next, measuring points on a target or structure to be measured in the SCS are selected and mapped to derive coordinates of the target under measurement or measuring points in all range-angle heatmaps of the microwave transceivers (also called range-angle unit positions). Further, measuring points matched across the microwave transceivers are selected based on the resulting coordinates in the microwave range-angle heatmaps. All the microwave transceivers are controlled to simultaneously measure displacement time series of the target under measurement or measuring points, and 3D displacement time series of the target or measuring points in the DCS are derived. Finally, if required, a transformation relationship from the DCS to the SCS is described to calculate 3D displacement time series of the target or measuring points in the SCS.

Step 1: Arrange microwave transceivers, establish an SCS and calculate 3D coordinates of each microwave transceiver in the SCS.

Step 1.1: Arrange microwave transceivers.

After a target under measurement is selected, three or more microwave transceivers are arranged non-collinearly in front of the target under measurement, and an angle of detection of each of the microwave transceivers is adjusted so that its FoV covers the target under measurement and the reference targets. Since each microwave transceiver can provide displacement time series of the target under measurement in one dimension, three or more microwave transceivers are required to measure displacement time series of the target under measurement in 3D space. If three collinear microwave transceivers have their LoS directions passing through a single target under measurement, they will be located within a single plane. Accordingly, displacement time series that they measure in their LoS directions will only contain information about the same two-dimensional (2D) plane, but not information about the remaining one dimension. That is, it is impossible to obtain 3D displacement time series of the target under measurement. For this reason, the three microwave transceivers must be non-collinear.

Step 1.2: Establish an SCS.

Three or more calibration reference targets are placed in the vicinity of the target under measurement. Alternatively, existing targets or measuring points in the FoVs are selected as the reference targets. An SCS is then established with the reference targets.

Optionally, an SCS $O^S$-$X^SY^SZ^S$ is established with three reference targets (referred to hereinafter as Nos. 1 to 3). Two displacement directions under measurement are selected for the target under measurement, and a plane defined by these directions is taken as a reference plane. The three reference targets, with which the SCS is established, are located non-collinearly within the reference plane. The origin $O^S$ of the coordinate system is located at the position of No. 1 reference target laterally behind the target under measurement. A positive direction of the $Y^S$ axis points from No. 1 reference target to No. 2 reference target. A positive direction of the $X^S$ axis is perpendicular to the positive direction of the $Y^S$ axis and points toward a half-plane where No. 3 reference target is located. A positive direction of the $Z^S$ axis points toward a half-space where the microwave transceivers are located. The reference targets are arranged so that the positive directions of the three axes follow the right-hand rule for coordinate systems. Coordinates of the three reference targets in the SCS are denoted as $$\left(x_{ref,1}^S, y_{ref,1}^S, z_{ref,1}^S\right), \left(x_{ref,2}^S, y_{ref,2}^S, z_{ref,2}^S\right), \left(x_{ref,3}^S, y_{ref,3}^S, z_{ref,3}^S\right).$$

If the three reference targets were collinear, then they would be in one-dimensional (1D) space and could not be used to establish an SCS, or to calculate coordinates of the three microwave transceivers in the SCS, or to perform 3D displacement measurement of the target under measurement in the SCS. Therefore, the three reference targets must be non-collinear.

Step 1.3: Calculate 3D coordinates of each microwave transceiver in the SCS.

Distances between Nos. 1 to 3 reference targets are measured or determined based on a priori knowledge, and denoted as $r_{12}$, $r_{13}$, $r_{23}$, where $r_{ij}$ represents the distance between No. i reference target and No. j reference target (1≤i≤j≤3). After that, all the microwave transceivers are controlled to simultaneously transmit FMCW microwave signals and receive corresponding echo signals. Distances between the microwave transceivers and the reference targets are calculated using any of methods including baseband signal beat frequency estimation and denoted as $$R^p_{ref,i},$$

which represents the Euclidean distance between the p-th microwave transceiver and the i-th reference target (p=A, B, C; i=1, 2, 3). Coordinates of the microwave transceivers A, B, C are calculated as:

$$xDev^S_p = \frac{(R^p_{ref,1})^2 + r_{13}^2 - (R^p_{ref,3})^2}{2r_{13}\sin\gamma} + \cos\gamma\frac{(R^p_{ref,2})^2 - r_{12}^2 - (R^p_{ref,1})^2}{2r_{12}\sin\gamma}$$

$$yDev^S_p = \frac{(R^p_{ref,1})^2 + r_{12}^2 - (R^p_{ref,2})^2}{2r_{12}}$$

$$zDev^S_p = \sqrt{(R^p_{ref,1})^2 - (xDev^S_p)^2 - (yDev^S_p)^2}$$

where $$q = A, B, C, \gamma = \arccos\left(\frac{r_{12}^2 + r_{13}^2 - r_{23}^2}{2r_{12}r_{13}}\right), (xDev^S_A, yDev^S_A, zDev^S_A)$$

are the coordinates of the microwave transceiver A in the SCS, $$(xDev^S_B, yDev^S_B, zDev^S_B)$$

are the coordinates of the microwave transceiver B in the SCS and $$(xDev^S_C, yDev^S_C, zDev^S_C)$$

are the coordinates of the microwave transceiver C in the SCS.

Step 2: Establish a DCS.

A DCS is established with spatial positions of the three or more microwave transceivers. Optionally, a DCS $O^D$-$X^DY^DZ^D$ is established with the three non-collinear microwave transceivers in step 1.3. The microwave transceiver A is chosen to define the origin $O^D$ of the DCS. A plane defined by the microwave transceivers A, B, C are taken as the $X^DO^DY^D$ plane of the DCS. The $Z^D$ axis is oriented perpendicular to the $X^DO^DY^D$ plane, passes through the position of the microwave transceiver A and points toward the side of the target. A line connecting the microwave transceiver A to the microwave transceiver B defines the $Y^D$ axis of the DCS, and a positive direction of this axis points from the microwave transceiver A toward the microwave transceiver B. The microwave transceiver A and the microwave transceiver B are selected based on the criterion that a cross product associated with the $Y^D$ and $Z^D$ axes of the DCS points toward a half-space where the last microwave transceiver (i.e., the microwave transceiver C) is located. In this way, a positive direction of the $X^D$ axis of the DCS is determined by the cross product associated with the $Y^D$ and $Z^D$ axes and passes through the position of the microwave transceiver A.

Step 3: Select measuring points on the target or structure to be measured in the SCS and map them to derive coordinates of the target under measurement or measuring points in all range-angle heatmaps of the microwave transceivers.

Denoting coordinates of a measuring point q in the SCS as $$(x^S_q, y^S_q, z^S_q),$$

(q=1, 2, 3, . . . ), an algorithm for matching coordinates of the measuring point in the SCS with range-angle heatmaps of the microwave transceivers may be used to derive coordinates of the measuring point q in the range-angle heatmap of the p-th microwave transceiver as $$(R^p_q, \theta^p_q),$$

where $$R^p_q$$

represents a range coordinate of the measuring point q in the range-angle heatmap of the p-th microwave transceiver, $$\theta^p_q$$

represents an angle coordinate of the measuring point q in the range-angle heatmap of the p-th microwave transceiver, and p is the index number of the microwave transceiver and p=A, B, C, . . . .

The algorithm for matching coordinates of the measuring point in the SCS with range-angle heatmaps of the microwave transceivers may specially involve the steps described below.

Vector matrices $\vec{v}_{ref,p}$ pointing from the p-th (p=A, B, C) microwave transceiver toward the reference targets are defined as:

$$\vec{v}_{ref,p} = \begin{bmatrix} \vec{v}_{ref,p1} \\ \vec{v}_{ref,p2} \\ \vec{v}_{ref,p3} \end{bmatrix} = \begin{bmatrix} x^S_{ref,1} - xDev^S_p & y^S_{ref,1} - yDev^S_p & z^S_{ref,1} - zDev^S_p \\ x^S_{ref,2} - xDev^S_p & y^S_{ref,2} - yDev^S_p & z^S_{ref,2} - zDev^S_p \\ x^S_{ref,3} - xDev^S_p & y^S_{ref,3} - yDev^S_p & z^S_{ref,3} - zDev^S_p \end{bmatrix} (p = A, B, C).$$

Denoting a unit normal vector of a zero-degree plane of the range-angle heatmap of the p-th (p=A, B, C) microwave transceiver as $\vec{n}_p$ (p=A, B, C) as $\vec{n}_p$, because $$\begin{cases} \vec{v}_{ref,p1} \cdot \vec{n}_p = R^p_{ref,1}\sin(\theta^p_{ref,1}) \\ \vec{v}_{ref,p2} \cdot \vec{n}_p = R^p_{ref,2}\sin(\theta^p_{ref,2})(p = A, B, C), \\ \vec{v}_{ref,p3} \cdot \vec{n}_p = R^p_{ref,3}\sin(\theta^p_{ref,3}) \end{cases}$$

we can obtain $$\vec{n}_p = (\vec{v}_{ref,p})^{-1} \cdot \begin{bmatrix} R^p_{ref,1}\sin(\theta^p_{ref,1}) \\ R^p_{ref,2}\sin(\theta^p_{ref,2}) \\ R^p_{ref,3}\sin(\theta^p_{ref,3}) \end{bmatrix} (p = A, B, C).$$

For the measuring point q with the coordinates $$(x^S_q, y^S_q, z^S_q),$$

in the SCS, its coordinates in the range-angle heatmap of the p-th (p=A, B, C) microwave transceiver may be obtained according to:

$$R^p_q = \sqrt{(x^S_q - xDev^S_p)^2 + (y^S_q - yDev^S_p)^2 + (z^S_q - zDev^S_p)^2}$$

$$\theta^p_q = \arcsin\left(\frac{(x^S_q - xDev^S_p, y^S_q - yDev^S_p, z^S_q - zDev^S_p) \cdot \vec{n}_p}{\|(x^S_q - xDev^S_p, y^S_q - yDev^S_p, z^S_q - zDev^S_p)\|}\right).$$

Step 4: Control all the microwave transceivers to simultaneously monitor displacement time series of the target under measurement or measuring points and derive 3D displacement time series of the target or measuring points in the DCS.

According to the resulting coordinates in the microwave range-angle heatmaps, measuring points $$(R^p_q, \theta^p_q),$$

corresponding to the microwave transceivers are selected to control all the microwave transceivers to simultaneously transmit FMCW microwave signals and receive corresponding echo signals. Displacement time series of the measuring point q in the LoS directions are extracted from baseband signals of the microwave transceivers and denoted as $$dR^p_q(mT),$$

where m is the index number of an equivalent displacement sampling period and m=1, 2, . . . ; T is a length of time of the equivalent displacement sampling period; and p is the index number of the microwave transceiver and p=A, B, C, . . . .

Displacement time series of the measuring point q along the axes of the DCS are then derived as $$dx^D_q(mT), dy^D_q(mT), dz^D_q(mT),$$

using any of methods including multidimensional deformation and vibration measurement via microwave sensing.

Step 5: Derive a coordinate transformation relationship from the DCS to the SCS and calculate 3D displacement time series of the target or measuring points in the SCS.

Step 5.1: Derive a coordinate transformation relationship from the DCS to the SCS.

A rotation matrix from the DCS to the SCS is denoted as R and translation matrix as t.

The rotation matrix R and the translation matrix t may be derived using standard orthogonal basis transformation.

A standard orthogonal basis of the SCS can be expressed as $$\vec{e_1} = \begin{pmatrix} 1 \\ 0 \\ 0 \end{pmatrix}, \vec{e_2} = \begin{pmatrix} 0 \\ 1 \\ 0 \end{pmatrix}, \vec{e_3} = \begin{pmatrix} 0 \\ 0 \\ 1 \end{pmatrix},$$

and a standard orthogonal basis of the DCS as $$\vec{f_1} = \vec{x^D_0}, \vec{f_2} = \vec{y^D_0}, \vec{f_3} = \vec{z^D_0},$$

where $$\vec{x^D_0}, \vec{y^D_0}, \vec{z^D_0}$$

represent unit vectors of the $O^DX^D$, $O^DY^D$, $O^DZ^D$ directions of the DCS. $\vec{f}_1$, $\vec{f}_2$, $\vec{f}_3$ can be expressed as the following linear combinations of $\vec{e}_1$, $\vec{e}_2$, $\vec{e}_3$:

$$\vec{f_1} = \vec{x^D_0} = p_{11}\vec{e_1} + p_{12}\vec{e_2} + p_{13}\vec{e_3} = \begin{pmatrix} p_{11} \\ p_{12} \\ p_{13} \end{pmatrix},$$

$$\vec{f_2} = \vec{y^D_0} = p_{21}\vec{e_1} + p_{22}\vec{e_2} + p_{23}\vec{e_3} = \begin{pmatrix} p_{21} \\ p_{22} \\ p_{23} \end{pmatrix},$$

$$\vec{f_3} = \vec{z^D_0} = p_{31}\vec{e_1} + p_{32}\vec{e_2} + p_{33}\vec{e_3} = \begin{pmatrix} p_{31} \\ p_{32} \\ p_{33} \end{pmatrix}.$$

Assuming $$\overrightarrow{coor_A} = (xDev^S_A, yDev^S_A, zDev^S_A)^T,$$

$$\overrightarrow{coor_B} = (xDev^S_B, yDev^S_B, zDev^S_B)^T,$$

$$\overrightarrow{coor_C} = (xDev^S_C, yDev^S_C, zDev^S_C)^T,$$

where $(*)^T$ represents a transpose of the matrix, then $$\vec{f_2} = \frac{\left(\overrightarrow{coor_B} - \overrightarrow{coor_A}\right)}{\left|\overrightarrow{coor_B} - \overrightarrow{coor_A}\right|},$$

$$\vec{f_3} = \frac{\left(\overrightarrow{coor_C} - \overrightarrow{coor_A}\right) \times \vec{f_2}}{\left|\overrightarrow{coor_C} - \overrightarrow{coor_A}\right|},$$

$$\vec{f_1} = \vec{f_2} \times \vec{f_3}.$$

Thus, the rotation matrix R from the DCS to the SCS is obtained as $$R = \left[\vec{f_1} \ \vec{f_2} \ \vec{f_3}\right],$$

and the translation matrix t from the DCS to the SCS as $$t = \left(xDev_A^S, yDev_A^S, zDev_A^S\right)^T,$$

where $(*)^T$ represents a transpose of the matrix.

For the measuring point q, from the rotation matrix R and the translation matrix t, we can obtain:

$$\begin{pmatrix} x_q^S \\ y_q^S \\ z_q^S \end{pmatrix} = R \begin{pmatrix} x_q^D \\ y_q^D \\ x_q^D \end{pmatrix} + t$$

where $$\begin{pmatrix} x_q^S \\ y_q^S \\ z_q^S \end{pmatrix}$$

represents coordinates of the measuring point q in the SCS, and $$\begin{pmatrix} x_q^D \\ y_q^D \\ z_q^D \end{pmatrix}$$

represents coordinates of the measuring point q in the DCS.

Step 5.2: Calculate 3D displacement time series of the target or measuring points in the SCS.

The coordinate conversion equations in step 5.1 are expanded into:

$$\begin{cases} x_q^S = p_{11}x_q^D + p_{21}y_q^D + p_{31}z_q^D + xDev_A^S \\ y_q^S = p_{12}x_q^D + p_{22}y_q^D + p_{32}z_q^D + yDev_A^S \\ z_q^S = p_{13}x_q^D + p_{23}y_q^D + p_{33}z_q^D + zDev_A^S \end{cases}.$$

These equations are differentiated to give transformed displacement time series $$dx_q^S(mT)$$

of the measuring point q in the X axis of the SCS, transformed displacement time series $$dy_q^S(mT),$$

of the measuring point q in the Y axis of the SCS and transformed displacement time series $$dz_q^S(mT)$$

of the measuring point q in the Z axis of the SCS:

$$\begin{cases} dx_q^S = p_{11}dx_q^D + p_{21}dy_q^D + p_{31}dz_q^D \\ dy_q^S = p_{12}dx_q^D + p_{22}dy_q^D + p_{32}dz_q^D \\ dz_q^S = p_{13}dx_q^D + p_{23}dy_q^D + p_{33}dz_q^D \end{cases}.$$

Figure 7:
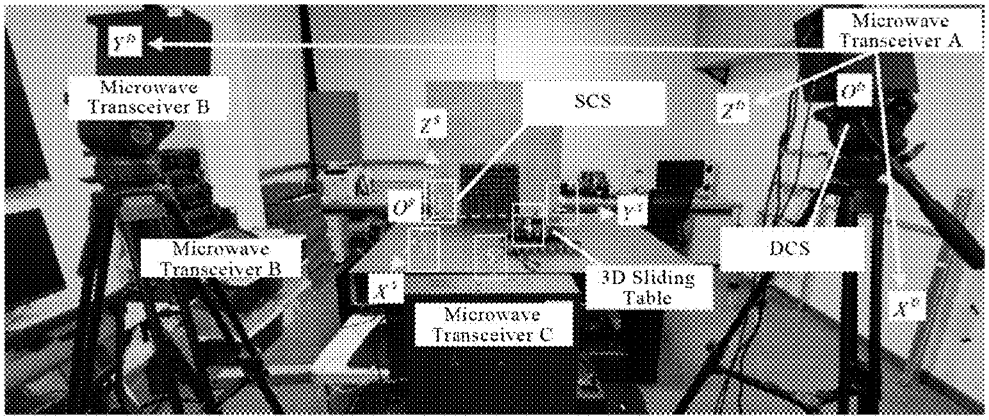
FIG. 7 schematically illustrates an experimental test scenario according to an embodiment of the present application.
Figure 8:
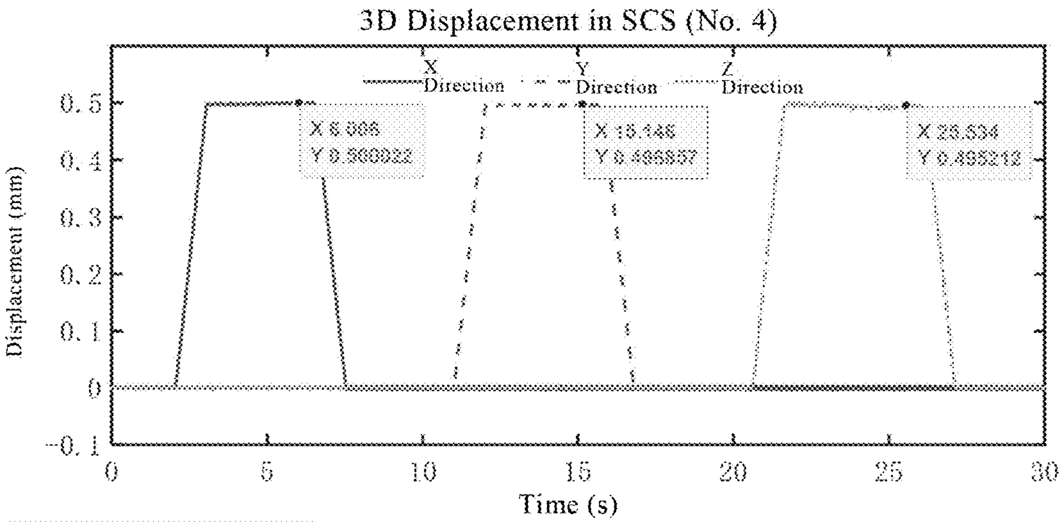
FIG. 8 schematically illustrates experimental test results according to an embodiment of the present application.
Figure 8:
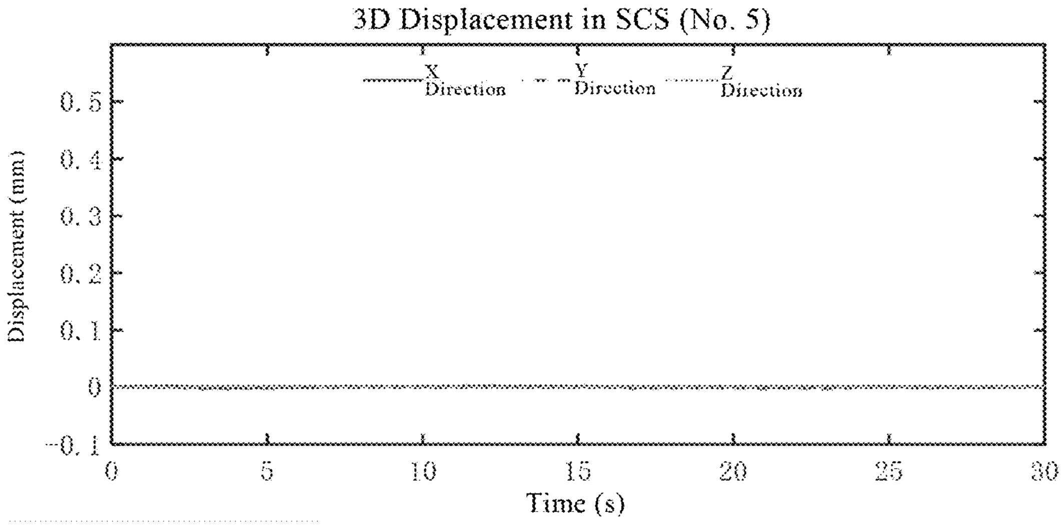

FIGS. 7 and 8 show the results of an exemplary experimental test conducted in accordance with a method of full-field 3D vibrational and deformational displacement measurement via microwave sensing according to the present application.

As shown in FIG. 6, three (Nos. 1 to 3) corner reflectors were used as reference targets to establish an SCS. No. 4 corner reflector was placed on a 3D sliding table as a target, and the table was designed to move in directions parallel to the respective three coordinate axes of the SCS. No. 5 corner reflector was also placed on the table as another target and kept stationary throughout the test. The 3D sliding table was controlled to reciprocate once with amplitude of 0.5 mm in each of the three axes $X^S$, $Y^S$, $Z^S$ of the SCS. 3D displacement calculation results of the targets (i.e, Nos. 4 and 5 corner reflectors) in the SCS were obtained according to the method. FIG. 8(*a*) shows the 3D displacement calculation results of No. 4 corner reflector (target) in the SCS, and FIG. 8(*b*) shows the 3D displacement calculation results of No. 5 corner reflector (target) in the SCS. As can be seen, the measured displacement amplitude of the No. 4 corner reflector (target) deviated from the predetermined amplitude by less than 1%. The measured displacement of the No. 5 corner reflector (target) within the test does not exceed 10 μm. These demonstrate that the method of the present application is capable of accurate full-field 3D displacement measurement via microwave sensing in the SCS.

Figure 9:
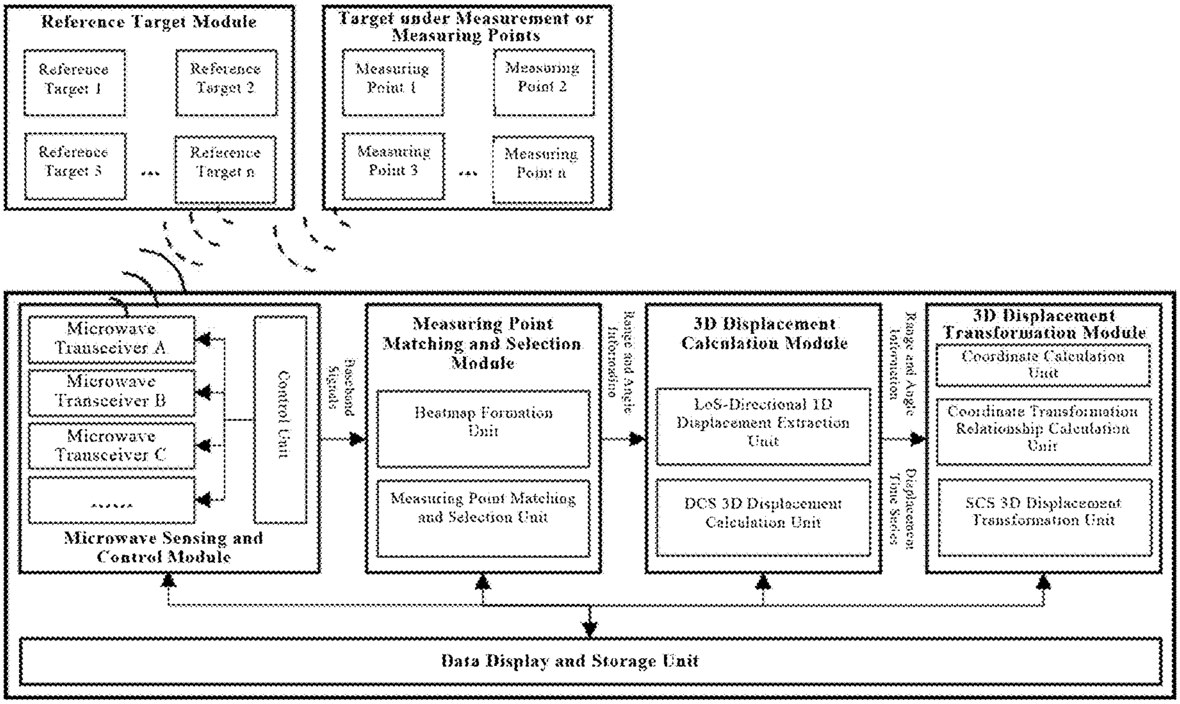
FIG. 9 shows the structure of a system of full-field 3D displacement measurement via microwave sensing according to another embodiment of the present application.

FIG. 9 is a block diagram of a system of full-field 3D vibrational and deformational displacement measurement via microwave sensing according to some embodiments. The system may include:

a microwave sensing and control module including three or more microwave transceivers and a control unit;

microwave transceivers for monitoring displacement time series of reference targets and a target under measurement, transmitting and receiving electromagnetic wave signals and outputting baseband signals;

a control unit for controlling all the microwave transceivers to perform simultaneous monitoring and providing the microwave transceivers with sensing parameters;

a reference target module including three or more calibration reference targets, which are manually arranged or selected existing targets in an FoV, and with which a user-defined SCS is established;

a measuring point matching and selection module including a heatmap formation unit and a measuring point matching and selection unit, the heatmap formation unit configured for formation of microwave range-angle heatmaps based on the baseband signals, the measuring point matching and selection unit configured for mapping of measuring points on the target under measurement selected in the SCS to coordinates in the range-angle heatmaps of the microwave transceiver and for the selection of the measuring points;

a 3D displacement calculation module including an LoS-directional 1D displacement extraction unit and an DCS 3D displacement calculation unit, the LoS-directional 1D displacement extraction unit configured to receive the baseband signals output from the microwave transceivers and extract initial LoS-directional 1D displacement time series of each single measuring point measured by the microwave transceivers, the DCS 3D displacement calculation unit configured to use any of algorithms including multidimensional deformation and vibration measurement via microwave sensing to obtain 3D displacement time series of the measuring points on the target under measurement along the axes of the DCS based on displacements of the measuring points on the target under measurement in the LoS directions of the microwave transceivers and a related geometric relationship including geometric distances between the microwave transceivers;

a 3D displacement transformation module including a coordinate transformation relationship calculation unit and an SCS 3D displacement transformation unit, the coordinate transformation relationship calculation unit configured to establish a coordinate transformation relationship from the DCS to the user-defined SCS, the SCS 3D displacement transformation unit configured to use coordinate transformation matrices obtained by the coordinate transformation relationship calculation unit to convert the 3D displacement time series of the measuring points on the target under measurement along the axes of the DCS into corresponding 3D displacement time series of the measuring points in the user-defined SCS; and a data display and storage unit for displaying and storing the initial LoS-directional 1D displacement time series, the 3D displacement time series in the DCS and the SCS, distances between the reference targets, Euclidean distances from the reference targets and the measuring points on the target under measurement to the microwave transceivers, and intermediate information including the 3D coordinates of the microwave transceivers in the SCS.

The present application overcomes the problems with conventional microwave sensing based 3D displacement measurement methods, including difficult matching of measuring points across multiple devices and reliance of displacement measurement results only on a coordinate system established with the multiple devices. It allows a user to define an SCS and enables selection of measuring points and matching of them across multiple devices. Moreover, 3D displacement measurement results obtained in the DCS can be converted into the user-defined SCS. Thus, measuring points can be selected more efficiently, facilitating post-processing, analysis and calculation in various scenarios. Further, the scope of application of vibrational and deformational displacement measurement via microwave sensing in practical test scenarios is expanded.

Embodiments of the present application may take the form of a system, a method, a device and/or a computer program product. The computer program product may include a computer-readable storage medium storing thereon computer-readable program instructions executable by a processor to implement various aspects of the application.

In some embodiments, the present application also provides a computer device, apparatus or terminal. The computer device, apparatus or terminal includes, connected by a system bus, a processor, a memory, a network interface, a display screen and an input device. The processor is used to provide computing and control capabilities, and the memory includes a non-volatile storage medium and an internal memory. The non-volatile storage medium stores an operating system and a computer program. The internal memory provides an environment in which the operating system and computer program in the non-volatile storage medium can run. The network interface is used to communicate with external terminals via a network connection. When executed by the processor, the computer program implements the various methods, processes and steps disclosed herein. Alternatively, when executed by the processor, the computer program performs the functions of the various modules or units in the embodiments disclosed therein. The display screen may be a liquid crystal display screen or an electronic ink display screen. The input device may be a touch layer covered on the display screen, or buttons, a trackball or touchpad disposed on a casing, or an external keyboard, touch panel, mouse, etc.

As an example, the computer program may be divided into one or more modules or units, which are stored in the memory and can be executed by the processor to implement this application. These modules or units may be a series of computer program instruction segments capable of performing particular functions. The instruction segments are used to describe a process of execution of the computer program in the device, apparatus or terminal.

The aforementioned device, apparatus or terminal may be a desktop computer, notebook, mobile electronic device, palmtop PC, cloud server or other computing device. Those skilled in the art will appreciate that the structures shown in the figures are merely block diagrams of some structures in relation to this application and does not limit the device, apparatus or terminal to which the application is applied. In practice, the device, apparatus or terminal may include more or less components than as shown in the figures, or combine some components, or have a different arrangement of components.

The processor may be a central processing unit (CPU), or other general- or special-purpose processor, microprocessor, digital signal processor (DSP), application specific integrated circuit (ASIC), field-programmable gate array (FPGA), or other programmable logic device, discrete gate or transistor-transistor logic device, discrete hardware component, etc. The processor is a control center of the aforementioned device, apparatus or terminal, which connects various parts of the device, apparatus or terminal using various interfaces and connections.

The memory may be used to store computer programs, modules and data, and the processor implements various functions of the device, apparatus or terminal by running or executing the computer programs and/or modules stored in the memory and retrieving the data stored in the memory. The memory may essentially include a program storage area and a data storage area. The program storage area may store the operating system, an application program required by at least one function (e.g., for playback of a sound, image or the like), etc. The data storage area may store various types of data (e.g., multimedia data, documents, operation history, etc.) created depending on applications. In addition, the memory may include a high-speed random access memory or non-volatile memory, such as a hard disk drive, internal memory, plug-in hard disk, smart media card (SMC), secure digital (SD) card, flash card, magnetic disk storage device, flash memory device or other volatile solid-state storage device.

The present application also provides a computer-readable storage medium storing thereon a computer program, which implements steps in the above-described methods when executed by a processor. Those of ordinary skill in the art will appreciate that some or all the processes in the methods of the above embodiments may be implemented by associated hardware under instruction of the computer program. The computer program may be stored on a non-volatile computer-readable storage medium. The computer program, when executed, may include processes in the above-described various method embodiments. Any reference to memory, storage, database, or other medium used in the embodiments provided herein may include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache memory. By way of illustration and not limitation, RAM is available in a variety of forms such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), rambus direct RAM (RDRAM), direct bus dynamic RAM (DRDRAM), memory bus dynamic RAM (RDRAM), etc.

The modules and units integrated in the above-described apparatus or terminal device, when implemented in the form of software functional components and sold or used as a separate product, may be stored in a computer-readable storage medium. With this in mind, all or some processes in the various methods disclosed herein may also be implemented by associated hardware under instruction of a computer program. This computer program may be stored in a computer-readable storage medium and, when executed by a processor, can implement steps in the above-described various methods. The computer program may include computer program code possibly, among others, in the format of source code, object code, an executable file, or in some intermediate form. The computer-readable medium may include any entity or device, recording medium, USB flash drive, removable hard disk, magnetic disk, optical disk, computer memory, read-only memory (ROM), random access memory (RAM), electric carrier signal, telecommunication signal, software distribution medium or the like capable of carrying the computer program code. It is to be noted that the content contained in the computer-readable medium can be appropriately increased or decreased according to the requirements of legislation and patent practice in the jurisdiction.

In some embodiments, the various methods, processes, modules, devices, apparatuses or system disclosed herein may be implemented or executed in one or more processing means (e.g., digital processors, analog processors, digital circuits designed for information processing, analog circuits designed for information processing, state machines, computing devices, computers and/or other mechanisms for processing information electronically). The one or more processing means may include one or more devices that perform some or all operations in a method in response to instructions stored electronically on an electronic storage medium. The one or more processing means may include one or more devices configured and specifically designed by hardware, firmware and/or software to perform some or all operations in a method. Presented above are merely preferred particular embodiments of the present application, but the scope of protection of the application is not limited thereto. Equivalent substitutions or changes made by any person familiar with the art within the technical scope of the disclosure herein in light of the subject matter and inventive concept of this application shall be embraced within the scope of protection of the application.

Embodiments of this application may be implemented in hardware, firmware, software, or various combinations thereof, or as instructions stored on a machine-readable medium, which can be read and executed by one or more processing devices. In some implementations, a machine-readable medium may include various mechanisms for storing and/or transmitting information in a form that may be read by a machine (e.g., a computing device). For example, a machine-readable storage medium may include read-only memory, random access memory, magnetic disk storage media, optical storage media, flash memory devices, and other media for storing information, and a machine-readable transmission medium may include forms of propagated signals (including carrier waves, infrared signals, digital signals) and other media for transmitting information. While firmware, software, routines, or instructions may be described in the above disclosure in terms of specific exemplary aspects and embodiments performing certain actions, it will be apparent that such descriptions are merely for the sake of convenience and that such actions in fact result from machines, computing devices, processing devices, processors, controllers, or other devices or machines executing the firmware, software, routines, or instructions.

In the claims and description of the present application, a module for performing a specified function, or a module described with functional features, is intended to cover any means capable of performing the function, such as a combination of circuit elements for performing the function, software, hardware and a combination of software and hardware for performing or implementing the function, or any form of software, firmware, code and a combination thereof with an appropriate circuit or other device. Functions provided by various modules are combined together in the manner as claimed in the claims, so any modules, components or elements capable of providing those functions are to be considered as being equivalent or equally effective to the modules defined in the claims. According to the principles of equivalent transformations of electric circuits, circuit structures in some embodiments of the present application may be changed or modified, for example, by substituting a current source with a voltage source, or by replacing a series connection structure with a parallel connection structure, or otherwise, into more diverse embodiments. However, these changes and modifications are all within the scope of disclosure of the present application.

The present application has been disclosed herein by way of examples, one or more of which have been described in the specification or illustrated in the accompanying drawings. Each of the examples is presented to explain this application, is not intended to limit the application in any sense. In fact, for those skilled in the art, it is apparent that various modifications and variations are possible to the application without departing from the scope or spirit thereof. For example, a feature that has been described or illustrated as part of one embodiment may also be used with another embodiment to create a further embodiment. Accordingly, it is intended that the application covers any and all such modifications and variations made within the scope as defined by the appended claims and equivalents thereof. Although a few preferred specific embodiments of the present invention have been described in detail above, it will be understood that those of ordinary skill in the art can make various modifications and changes thereto based on the concept of the present invention without exerting any creative effort. Accordingly, all variant embodiments that can be obtained by those skilled in the art through logical analysis, inference or limited experimentation in accordance with the concept of the present invention on the basis of the prior art are intended to fall within the scope as defined by the appended claims.

The invention claimed is:

1. A method of full-field three-dimensional (3D) displacement measurement via microwave sensing, comprising:

selecting reference targets and establishing a structure coordinate system (SCS) based on a target under measurement;

calculating coordinates of microwave transceivers in the SCS based on distances between the microwave transceivers and the reference targets; wherein the microwave transceivers comprise a first microwave transceiver, a second microwave transceiver and a third microwave transceiver;

establishing a device coordinate system (DCS) based on the calculated coordinates of the first microwave transceiver, the second microwave transceiver and the third microwave transceiver in the SCS;

calculating coordinates of the target under measurement in range-angle heatmaps of the microwave transceivers based on coordinates of the target under measurement and the microwave transceivers in the SCS, and matching measuring points of the target under measurement in the range-angle heatmaps of the microwave transceivers;

monitoring displacement time series of the target under measurement by the first microwave transceiver, the second microwave transceiver and the third microwave transceiver, thereby obtaining initial 3D displacement time series of the target under measurement in the DCS;

establishing a coordinate transformation relationship from the DCS to the SCS based on the DCS and the SCS; and calculating transformed 3D displacement time series of the target under measurement in the SCS based on the coordinate transformation relationship and the initial 3D displacement time series.

2. The method of full-field 3D displacement measurement via microwave sensing of claim 1, wherein a detection field of view (FoV) of the first microwave transceiver covers the target under measurement and the reference targets;

a detection FoV of the second microwave transceiver covers the target under measurement and the reference targets; and a detection FoV of the third microwave transceiver covers the target under measurement and the reference targets.

3. The method of full-field 3D displacement measurement via microwave sensing of claim 1, wherein the positions of the first microwave transceiver, the second microwave transceiver and the third microwave transceiver are non-collinear.

4. The method of full-field 3D displacement measurement via microwave sensing of claim 1, wherein the reference targets comprise a first reference target, a second reference target and a third reference target;

wherein selecting the reference targets comprises:

selecting a plane defined by two displacement directions to be measured for the target under measurement as a reference target plane;

selecting the first reference target, the second reference target and the third reference target in the reference target plane, wherein the first reference target, the second reference target and the third reference target are non-collinear; and establishing the SCS based on the first reference target, the second reference target and the third reference target.

5. The method of full-field 3D displacement measurement via microwave sensing of claim 4, wherein the SCS comprises an origin $O^S$, an $X^S$ axis, a $Y^S$ axis and a $Z^S$ axis, wherein:

the origin $O^S$ is at the position of the first reference target;

a positive direction of the $Y^S$ axis is a direction pointing from the first reference target toward the second reference target;

a positive direction of the the $X^S$ axis is perpendicular to the positive direction of the $Y^S$ axis and points toward a half-plane where the third reference target is located; and a positive direction of the $Z^S$ axis points toward a half-space where the first microwave transceiver, the second microwave transceiver and the third microwave transceiver are located.

6. The method of full-field 3D displacement measurement via microwave sensing of claim 4, wherein calculating coordinates of microwave transceivers in the SCS based on distances between the microwave transceivers and the reference targets comprises:

calculating coordinates of the first microwave transceiver in the SCS based on distances between the first microwave transceiver and the first reference target, the second reference target and the third reference target, respectively, and/or calculating coordinates of the second microwave transceiver in the SCS based on distances between the second microwave transceiver and the first reference target, the second reference target and the third reference target, respectively, and/or calculating coordinates of the third microwave transceiver in the SCS based on distances between the third microwave transceiver and the first reference target, the second reference target and the third reference target, respectively.

7. The method of full-field 3D displacement measurement via microwave sensing of claim 1, wherein the DCS comprises an origin $O^D$, an $X^D$ axis, a $Y^D$ axis and a $Z^D$ axis, wherein:

the origin $O^D$ is at the position of the first microwave transceiver;

an $X^DO^DY^D$ plane of the DCS is defined by the positions of the first microwave transceiver, the second microwave transceiver and the third microwave transceiver;

the $Z^D$ axis is perpendicular to the $X^DO^DY^D$ plane and points toward the target under measurement;

a positive direction of the $Y^D$ axis is a direction pointing from the first microwave transceiver toward the second microwave transceiver; and a positive direction of the $X^D$ axis is a direction pointing toward a half-space where the third microwave transceiver is located.

8. The method of full-field 3D displacement measurement via microwave sensing of claim 1, wherein calculating coordinates of the target under measurement in range-angle heatmaps of the microwave transceivers based on coordinates of the target under measurement and the microwave transceivers in the SCS comprises:

calculating coordinates of the target under measurement in a range-angle heatmap of the first microwave transceiver based on coordinates of the target under measurement and the first microwave transceiver in the SCS, and/or calculating coordinates of the target under measurement in a range-angle heatmap of the second microwave transceiver based on the coordinates of the target under measurement and the second microwave transceiver in the SCS, and/or calculating coordinates of the target under measurement in a range-angle heatmap of the third microwave transceiver based on the coordinates of the target under measurement and the third microwave transceiver in the SCS.

9. The method of full-field 3D displacement measurement via microwave sensing of claim 8, wherein matching measuring points of the target under measurement in the range-angle heatmaps of the microwave transceivers comprises:

matching measuring points on the target under measurement at the first microwave transceiver based on the coordinates of the target under measurement in the range-angle heatmap of the first microwave transceiver, and/or matching measuring points on the target under measurement at the second microwave transceiver based on the coordinates of the target under measurement in the range-angle heatmap of the second microwave transceiver, and/or matching measuring points on the target under measurement at the third microwave transceiver based on the coordinates of the target under measurement in the range-angle heatmap of the third microwave transceiver.

10. The method of full-field 3D displacement measurement via microwave sensing of claim 1, wherein establishing a coordinate transformation relationship from the DCS to the SCS based on the DCS and the SCS comprises:

calculating the coordinate transformation relationship based on coordinates of the first microwave transceiver, the second microwave transceiver and the third microwave transceiver in the DCS and on the coordinates thereof in the SCS.

11. A device of full-field 3D displacement measurement via microwave sensing, comprising a memory, a processor and a computer program stored in the memory and executable on the processor, wherein the processor is configured to be able to implement, when executing the computer program, the steps in the method of full-field 3D displacement measurement via microwave sensing according to claim 1.

12. A system of full-field three-dimensional (3D) displacement measurement via microwave sensing, comprising:

a reference target module configured to be able to select reference targets and to establish a structure coordinate system (SCS) based on a target under measurement;

a coordinate calculation unit configured to be able to calculate coordinates of microwave transceivers in the SCS based on distances between the microwave transceivers and the reference targets; wherein the microwave transceivers comprise a first microwave transceiver, a second microwave transceiver and a third microwave transceiver;

a 3D displacement calculation module configured to be able to establish a device coordinate system (DCS) based on the calculated coordinates of the first microwave transceiver, the second microwave transceiver and the third microwave transceiver in the SCS;

a measuring point matching and selection module configured to be able to calculate coordinates of the target under measurement in range-angle heatmaps of the microwave transceivers based on coordinates of the target under measurement and the microwave transceivers in the SCS, and to match measuring points of the target under measurement in the range-angle heatmaps of the microwave transceivers;

a microwave sensing and control module configured to be able to monitor displacement time series of the target under measurement using the first microwave transceiver, the second microwave transceiver and the third microwave transceiver;

the 3D displacement calculation module further configured to be able to obtain initial 3D displacement time series of the target under measurement in the DCS;

a coordinate transformation relationship calculation unit configured to be able to establish a coordinate transformation relationship from the DCS to the SCS based on the DCS and the SCS; and an SCS 3D displacement transformation unit configured to be able to calculate transformed 3D displacement time series of the target under measurement in the SCS based on the coordinate transformation relationship and the initial 3D displacement time series.

13. The system of full-field 3D displacement measurement via microwave sensing of claim 12, wherein the reference targets comprise a first reference target, a second reference target and a third reference target;

the reference target module is further configured to be able to:

select a plane defined by two displacement directions to be measured for the target under measurement as a reference target plane;

select the first reference target, the second reference target and the third reference target in the reference target plane, wherein the first reference target, the second reference target and the third reference target are non-collinear; and establish the SCS based on the first reference target, the second reference target and the third reference target.

14. The system of full-field 3D displacement measurement via microwave sensing of claim 13, wherein the coordinate calculation unit is further configured to be able to calculate coordinates of the first microwave transceiver in the SCS based on distances between the first microwave transceiver and the first reference target, the second reference target and the third reference target, respectively, and/or calculate coordinates of the second microwave transceiver in the SCS based on distances between the second microwave transceiver and the first reference target, the second reference target and the third reference target, respectively, and/or calculate coordinates of the third microwave transceiver in the SCS based on distances between the third microwave transceiver and the first reference target, the second reference target and the third reference target, respectively.

15. The system of full-field 3D displacement measurement via microwave sensing of claim 12, wherein the measuring point matching and selection module is further configured to be able to calculate coordinates of the target under measurement in a range-angle heatmap of the first microwave transceiver based on coordinates of the target under measurement and the first microwave transceiver in the SCS, and/or calculate coordinates of the target under measurement in a range-angle heatmap of the second microwave transceiver based on the coordinates of the target under measurement and the second microwave transceiver in the SCS, and/or calculate coordinates of the target under measurement in a range-angle heatmap of the third microwave transceiver based on the coordinates of the target under measurement and the third microwave transceiver in the SCS.

16. The system of full-field 3D displacement measurement via microwave sensing of claim 15, wherein the measuring point matching and selection module is further configured to be able to match measuring points on the target under measurement at the first microwave transceiver based on the coordinates of the target under measurement in the range-angle heatmap of the first microwave transceiver, and/or match measuring points on the target under measurement at the second microwave transceiver based on the coordinates of the target under measurement in the range-angle heatmap of the second microwave transceiver, and/or match measuring points on the target under measurement at the third microwave transceiver based on the coordinates of the target under measurement in the range-angle heatmap of the third microwave transceiver.

17. The system of full-field 3D displacement measurement via microwave sensing of claim 12, wherein the coordinate transformation relationship calculation unit is further configured to be able to calculate the coordinate transformation relationship based on coordinates of the first microwave transceiver, the second microwave transceiver and the third microwave transceiver in the DCS and on the coordinates thereof in the SCS.

* * * * *